United States Patent [19]

Abraham et al.

[11] Patent Number: 5,313,629
[45] Date of Patent: May 17, 1994

[54] UNIT OF WORK FOR PRESERVING DATA INTEGRITY OF A DATA-BASE BY CREATING IN MEMORY A COPY OF ALL OBJECTS WHICH ARE TO BE PROCESSED TOGETHER

[75] Inventors: Robert L. Abraham; Richard E. Moore, both of Marietta; William L. Rich, Stone Mountain; Floyd W. Shackelford, Buford; John R. Tiller, Jr., Peachtree, all of Ga.; Cynthia A. Ross, Boynton Beach, Fla.; Richard S. Briggs, Jr., Bloomingdale, Ill.

[73] Assignee: International Business Machines Corporation, Armonk, N.Y.

[21] Appl. No.: 425,607

[22] Filed: Oct. 23, 1989

[51] Int. Cl.⁵ .......................................... G06F 15/40
[52] U.S. Cl. ................................... 395/600; 364/254; 364/282.1; 364/957; 364/DIG. 1
[58] Field of Search .................. 364/DIG. 1, DIG. 2; 395/600, 650, 700

[56] References Cited

U.S. PATENT DOCUMENTS

| | | | |
|---|---|---|---|
| 4,791,550 | 12/1988 | Stevenson et al. | 364/200 |
| 4,814,971 | 3/1989 | Thatte | 364/200 |
| 4,821,220 | 4/1989 | Duisberg | 364/578 |
| 4,853,843 | 8/1989 | Ecklund | 364/200 |
| 5,206,951 | 4/1993 | Khoyi et al. | 395/650 |

OTHER PUBLICATIONS

Ullman, Principles of Database Systems, Computer Science Press, 1980, pp. 353-357.
Kroenke, Database Processing, Science Research Associates, 1983, pp. 460-463, 506.

Primary Examiner—Thomas C. Lee
Assistant Examiner—Peter Y. Wang
Attorney, Agent, or Firm—Bell, Seltzer, Park & Gibson

[57] ABSTRACT

A Unit of Work object class for an object oriented database management system provides concurrent processing through Unit of Work levels and instances while maintaining the integrity of the data in the database. Each new Unit of Work assigned to a task is an instance of the Unit of Work object class. A Unit of Work manager controls each step such that manipulation of the data occurs to the copies at that particular level for that particular instance. Only after all levels have been completed satisfactorily will a "Commit" occur to the data in the database. If completion is not satisfactory, Rollback of the levels occur, thus preserving data integrity. The Unit of Work manager can also switch control between Unit of Work instances, thus permitting simultaneous performance of tasks.

9 Claims, 17 Drawing Sheets

|  | OBJECT A | OBJECT B | OBJECT C |
|---|---|---|---|
| LEVEL 1 | ADDRESS | ADDRESS | ADDRESS |
| LEVEL 2 | ADDRESS |  | ADDRESS |
| LEVEL 3 | ADDRESS | ADDRESS |  |

UNIT OF WORK INSTANCE OBJECT TABLE

FIG. 7.

UNIT OF WORK FOR PRESERVING DATA INTEGRITY OF A DATA-BASE BY CREATING IN MEMORY A COPY OF ALL OBJECTS WHICH ARE TO BE PROCESSED TOGETHER

FIELD OF THE INVENTION

This invention relates to database management systems and more particularly to a method and apparatus for preserving data integrity of the database.

BACKGROUND OF THE INVENTION

Computer based database management systems are widely used for storing and manipulating large sets of related data. Database management systems may be implemented on a personal computer, microcomputer or mainframe computer, using a computer program called a database management program or database manager. Although many database management systems are implemented using conventional programming techniques, state-of-the-art database management systems have been designed, and are now beginning to appear commercially, using object oriented programming systems and processes.

Object oriented programming systems and processes have been the subject of much investigation and interest in state of the art data processing environments. Object Oriented Programming is a computer program packaging technique which provides reusable and easily expandable programs. In contrast with known functional programming techniques which are not easily adaptable to new functional requirements and new types of data, object oriented programs are reusable and expandable as new requirements arise. With the ever increasing complexity of computer based systems, object oriented programming has received increased attention and investigation.

In an object oriented programming system, the primary focus is on data, rather than functions. Object oriented programming systems are composed of a large number of "objects". An object is a data structure and a set of operations or functions that can access that data structure. The data structure may be represented as a "frame". The frame has many "slots", each of which contains an "attribute" of the data in the slot. The attribute may be a primitive (i.e. an integer or string) or an Object Reference which is a pointer to another object's instance or instances (defined below). Each operation (function) that can access the data structure is called a "method".

FIG. 1 illustrates a schematic representation of an object in which a frame is encapsulated within its methods. FIG. 2 illustrates an example of an object, in which the data structure relates to employee data and a number of methods surround this data structure. One method, for example, obtains the age of an employee. Each defined object will usually be manifested in a number of "instances". Each instance contains the particular data structure for a particular example of the object. For example, an object for individual employee named Joyce Smith is an instance of the "employee" object Object oriented programming systems provide two primary characteristics which allow flexible and reusable programs to be developed. These characteristics are referred to as "encapsulation" and "inheritance". As may be seen from FIG. 1, the frame is encapsulated by its methods (functions). A wall of code has been placed around each piece of data. All access to the frame is handled by the surrounding methods. Data independence is thereby provided because an object's data structure is accessed only by its methods. Only the associated methods know the internal data structure. This ensures data integrity.

The "inheritance" property of object oriented programming systems allows previously written programs to be broadened by creating new superclasses and subclasses of objects. New objects are described by how they differ from preexisting objects so that entirely new programs need not be written to handle new types of data or functions.

FIG. 3 illustrates the inheritance property. For ease of illustration, the objects are illustrated as rectangles rather than as circles, with the object name at the top of a rectangle, the frame below the object name and the methods below the frame. Referring to FIG. 3, three object classes are illustrated for "salesperson", "employee" and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates and R. Moore are employees. J. McEnro, R. Nader and R. Reagan are persons. In other words, an instance is related to its class by an "is a" relation.

Each subclass "inherits" the frame and methods of its superclass. Thus, for example, a salesperson frame inherits age and hire date objects as well as promote methods from the employee superclass. Salesperson also includes a unique quota attribute and a pay commission method. Each instance can access all methods and frames of its superclass, so that, for example, B. G. Blue can be promoted.

In an object oriented system, a high level routine requests an object to perform one of its methods by sending the object a "message" telling the object what to do. The receiving object responds to the message by choosing the method that implements the message name, executing this method and then returning control to the calling high level routine, along with the results of the method.

Object oriented programming systems may be employed as database management systems which are capable of operating upon a large database, and which are expandable and adaptable. In an object oriented database management system, the data in the database is organized and encapsulated in terms of objects, with the instances of the objects being the data in the database. Similarly, the database manager may be organized as a set of objects with database management operations being performed by sending messages from one object to another. The target object performs the requested action on its attributes using its methods.

Whether a database management system is implemented using object oriented programming or conventional programming, a major concern of a database management system is preserving data integrity. Preserving data integrity is difficult as the size and complexity of the data increases. Moreover, for a very large database it is desirable to have multiple tasks performed concurrently, thereby further impacting data integrity.

More specifically, a database manager typically controls the performance of tasks on data in the database. Each task includes a number of steps, each step of which may result in modification of data in the database. Data integrity is lost when a task is aborted before completion. When a task is aborted before completion, the preceding steps in the task may have modified data in the database, thereby resulting in a loss of database integrity. The task may be aborted because a step has failed or because, under control of the database manager, a task is suspended in order to perform a second task to provide "concurrent" task processing. In such a concurrent scenario, the original task may never be completed, yet the database may have been modified as a result of completed steps in the original task. Moreover, each concurrently performed task may operate on the same elements from the database, thereby causing a second task to modify erroneous data placed in the database by the first task. Again, data integrity is lost.

SUMMARY OF THE INVENTION

It is therefore an object of the invention to provide an improved database management system.

It is another object of the invention to provide an improved database management system which is implemented as an object oriented programming system.

It is another object of the invention to provide an improved database management system which preserves the integrity of data in a database.

It is another object of the invention to provide an improved database management system which preserves the data integrity of the database notwithstanding a task being aborted before completion.

It is yet another object of the invention to provide a database management system which preserves the data integrity of the database during performance of multiple concurrent tasks.

These and other objects are provided according to the invention, in a database management system including a database of data elements stored in a data storage device and a database manager operating on a data processor for performing multiple tasks on the database, with each task including a number of steps which are capable of modifying the data elements in the database. According to the invention, the database manager includes a Unit of Work manager. The Unit of Work manager assigns a Unit of Work instance to each task and creates a Unit of Work level for each step in a task. In an object oriented programming system, the Unit of Work is a new object class, and an instance of the Unit of Work object class is created for each object instance to be operated upon by a task.

According to the invention, each Unit of Work level for a task includes a copy of the data elements from the database which are to be modified by the task. Each step in the task is controlled to modify the data elements in the associated Unit of Work level, rather than the data elements in the database itself. Accordingly, if a task is interrupted before completion, only the data elements in the Unit of Work level will have been modified. The data elements in the database will not have been modified. Similarly, if the database manager switches to a second task, the Unit of Work levels may be saved, and may be recalled when the task resumes.

More particularly, according to the present invention, a Unit of Work level is created for each step of a task. A succeeding Unit of Work level for a succeeding step in a task includes a copy of the data elements to be operated on by the succeeding step, in their "as modified" state from the preceding Unit of Work level for the preceding step. These "nested" copies provide a history trail of modifications made to the data. Accordingly, while each step operates on data as it would appear from the preceding step, the actual data in the database is not modified until the last step in a task has successfully completed. Thus, it is possible to "roll back" changes to the data at a particular Unit of Work level through appropriate nesting of Unit of Work levels.

The Unit of Work manager of the present invention may be employed with single task database management systems (i.e. systems which perform one task at a time), to provide data integrity in case the task does not complete or is suspended for any reason. Moreover, the Unit of Work manager of the present invention may be employed with simultaneous task database management systems (i.e. systems which can simultaneously perform multiple tasks), to provide data integrity when tasks are switched before completion. In that case, a copy of each Unit of Work instance is made for each of the multiple tasks. Each of the multiple copies includes multiple levels for each step as well.

The Unit of Work manager of the present invention may be implemented in functionally programmed database management systems. However, the Unit of Work manager is particularly advantageous for object oriented programming systems because these systems typically operate upon very large databases and are capable of multitasking. Object oriented programming systems typically implement a "messy desk" environment, in which numerous activities take place within the same application. In such an environment, data integrity is difficult to maintain.

In an object oriented programming system, the Unit of Work of the present invention is an object class, which includes methods for "commit", "discard", "new", "notify", "rollback", "start" and "switch". The commit method applies the changes made within the current Unit of Work level to the preceding Unit of Work level. If commit is performed when the Unit of Work level is "one", a physical update of the database occurs. Discard removes the specified Unit of Work instance from the system. All data within the discarded Unit of Work instance is lost. New begins an entirely new Unit of Work instance. Notify is used by an application program to tell the Unit of Work manager that a data element is about to be modified. Rollback destroys the changes made within the current Unit of Work level and drops back to the preceding Unit of Work level. Start begins a new nested Unit of Work level within the current Unit of Work instance. Finally, Switch is used to leave the current Unit of Work instance and to enter another, previously defined Unit of Work instance.

BRIEF DESCRIPTION OF THE DRAWINGS

FIG. 7 illustrates a schematic representation of the object table for a Unit of Work Instance according to the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

OBJECT ORIENTED COMPUTER SYSTEM

In an object oriented computer system, work is accomplished by sending action request messages to an object which contains (encapsulates) data. The object will perform the requested action on the data according to its predefined methods. The requestor of the action need not know what the actual data looks like or how the object manipulates it.

An object's class defines the types and meanings of the data and the action requests (messages) that the object will honor. The individual objects containing data are called instances of the class. Classes generally relate to real-world things. For example, "Parts" may be a class. The data elements (slots) of a part might be a part number, a status and a part type. The instances of this class represent individual parts, each with its own part number, status, and type information. The programs performing the requested actions are called methods of the class.

Object classes can be defined to be subclasses of other classes. Subclasses inherit all the data characteristics and methods of the parent class. They can add additional data and methods, and they can override (redefine) any data elements or methods of the parent class. While most messages are sent to object instances, the message that requests that a new instance be created is sent to an object class. The class will cause a new instance to be created and will return an object identifier by which that object will be known.

The sender of an action request message need not know the exact class of the object to which it is sending the message. As long as the target object either defines a method to handle the message or has a parent class that defines such a method, then the message will be handled using the data in the object instance and the method in its class or its parent class. In fact, it need not be an immediate parent, but may be a parent's parent, etc. The sender of the method need only have the object ID of the receiving object. This property of object oriented systems is called "inheritance". The inheritance property is used in the present invention.

Figure 4:
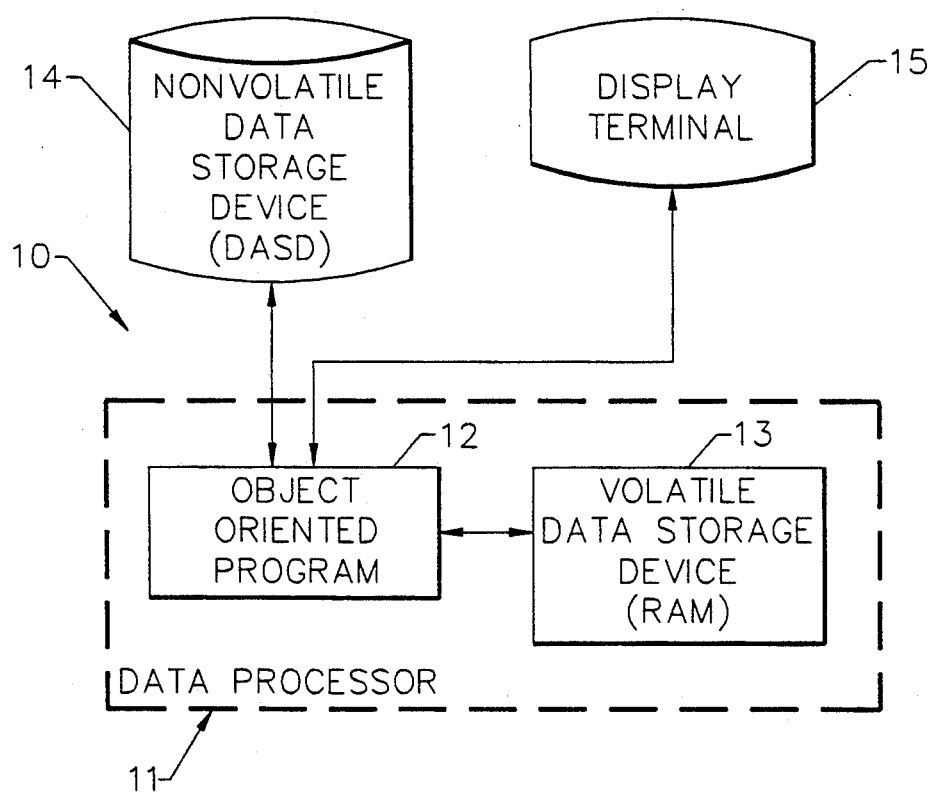
FIG. 4 illustrates a schematic block diagram of an object oriented computer system according to the present invention.

Referring now to FIG. 4, a schematic block diagram of an object oriented computer system 10 is illustrated. The system 10 includes a data processor 11 which may be a mainframe computer, minicomputer or personal computer. For large databases having multiple users, a mainframe computer is typically employed. As is well known to those having skill in the art, the data processor 10 includes a volatile data storage device 13, typically random access memory (RAM) for providing a working store for active data and intermediate results. Data in RAM 13 is erased when power to the data processor 11 is removed or a new user session is begun. System 10 also includes a nonvolatile data storage device 14 for permanent storage of objects. Device 14 may be a direct access storage device (DASD-a disk file) a tape file, an erasable optical disk or other well known device. Nonvolatile data storage device 14 will also be referred to herein as a "database". Volatile data storage device 13 will also be referred to as "memory". A display terminal 15 including a cathode ray tube (CRT) or other display, and a keyboard, is also shown.

An object oriented operating program 12 is also included in data processor 11. Object oriented operating program 12 may be programmed in object oriented languages such as "C" or "Smalltalk" or variations thereof, or in conventional programming languages such as FORTRAN or COBOL. The design of an object oriented operating program 12 is well known to those skilled in the art of object oriented programming systems, and will only be described generally below.

Figure 5:
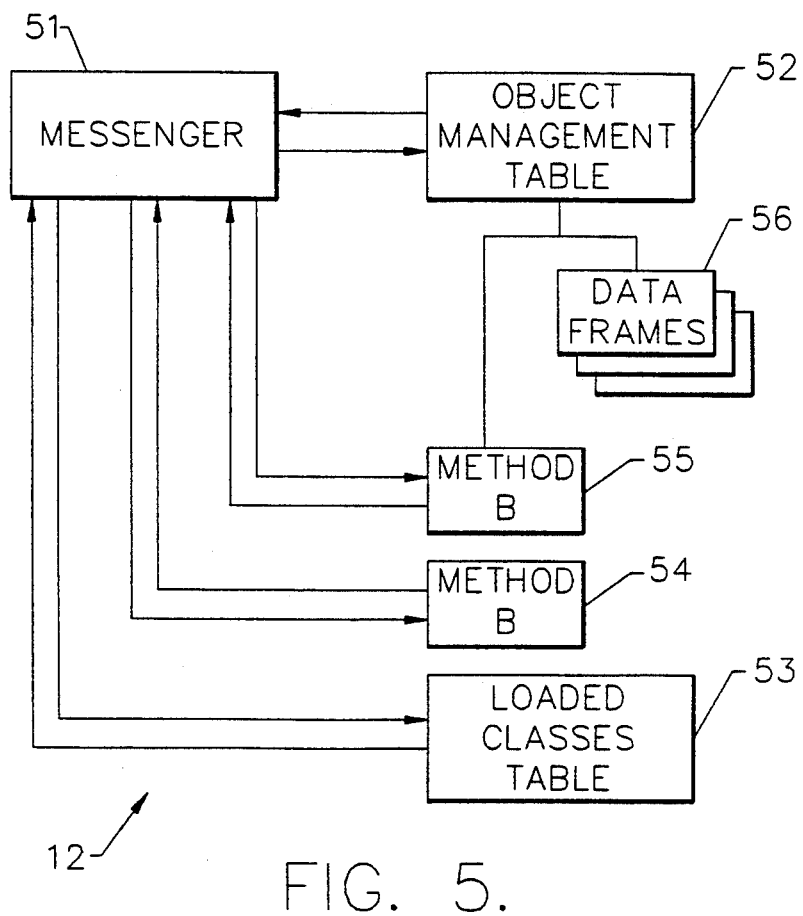
FIG. 5 illustrates a schematic block diagram of an object oriented program according to the present invention.

Referring now to FIG. 5, the main components of an object oriented program (12, FIG. 4) will be described. A more detailed description of the design and operation of an object oriented program is provided in "Object Oriented Software Construction", by Bertrand Meyer, published by Prentice Hall in 1988, the disclosure of which is incorporated herein by reference.

Referring to FIG. 5, object oriented program 12 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 12 will now be described for the example illustrated in FIG. 5, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

Object oriented program 12 typically includes a table for the methods associated with each object. This method table contains the method number and the corresponding address where the method is located. In addition, object oriented program 12 also typically includes an object identification table for each object. This table contains all instances for the object and the corresponding address or OREF for each instance. These tables are used in processing for executing the methods and for accessing objects as well as data instances of objects.

In many programming activities, and in object oriented programming systems in particular, it is desirable to process a number of tasks independently and in parallel without having one task impact another. Many database systems restrict a program to a single, sequentially ordered task. The primary restriction is the inability to specify what gets committed, rolled back, locked, or released. Additionally, resources are generally released after every database commit. These restrictions make it difficult to allow a user to operate within a "messy desk" environment where there are numerous concurrent activities within the same application.

The "Unit of Work" object class of the present invention allows one or more actions to be performed within a control context. In an object oriented programming system having the Unit of Work object class of the present invention, an application program identifies Units of Work. The object oriented program 12 (FIG. 4) includes a Unit of Work Manager, which provides application programs the ability to manage data and maintain the relational integrity of related work activities.

In operation, Unit of Work Manager is initiated by an application program. Programs which modify data are responsible for notifying the Unit of Work Manager. The Unit of Work manager makes multiple copies of the same object instance as a processing task proceeds through Unit of Work levels. Essentially, these multiple instances give a history trail of modifications made to the data. Thus, it is possible to "roll back" changes to the data at a particular Unit of Work level through appropriate nesting of Unit of Work levels. The Unit of Work Manager is used by a task to control a logical Unit of Work instance. The Unit of Work Manager is accessed by the task which then sends requests to the Unit of Work Manager as required to manipulate the current Unit of Work instance.

Figure 1:
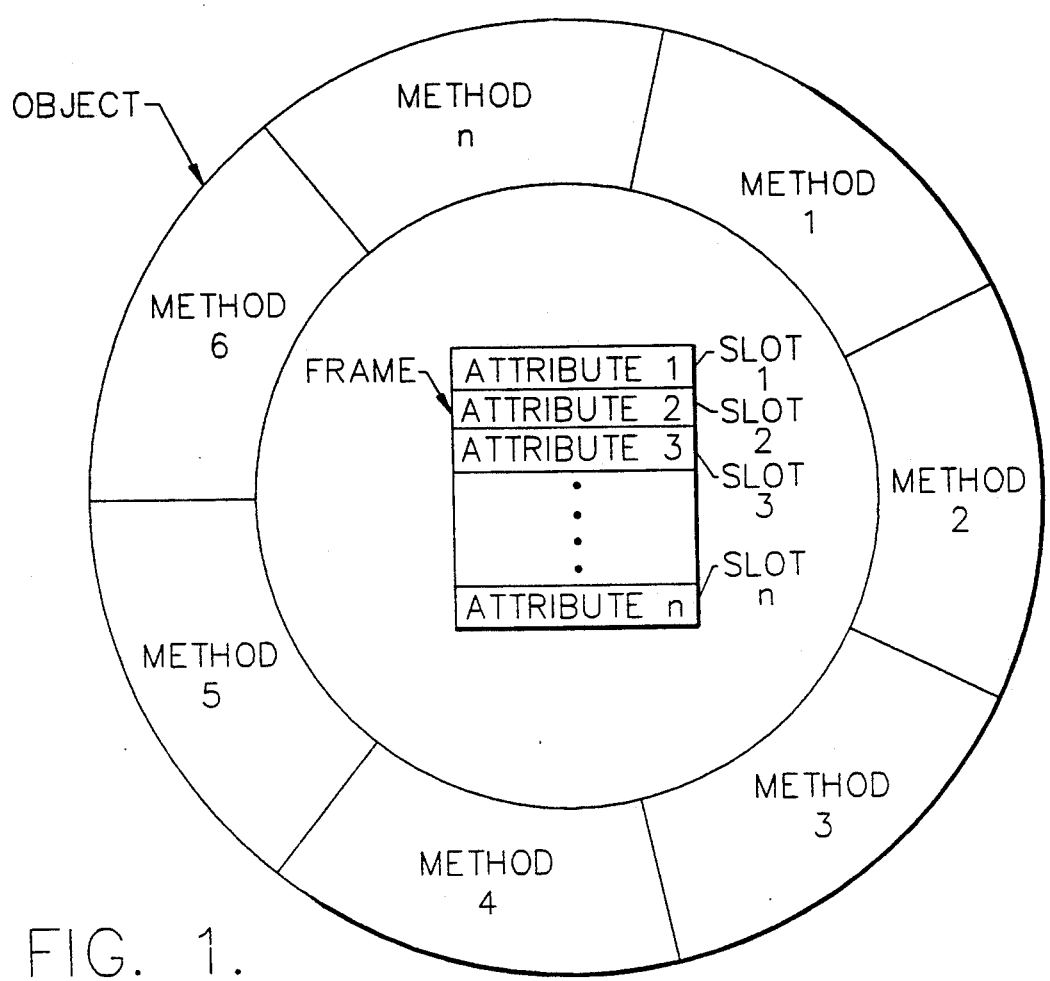
FIG. 1 illustrates a schematic representation of an object.
Figure 2:
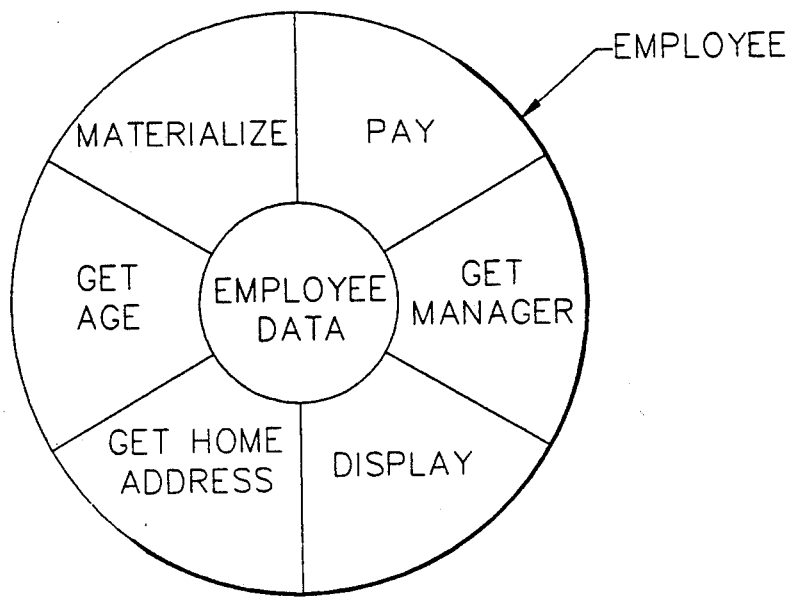
FIG. 2 illustrates a schematic representation of the example of an object.
Figure 3:
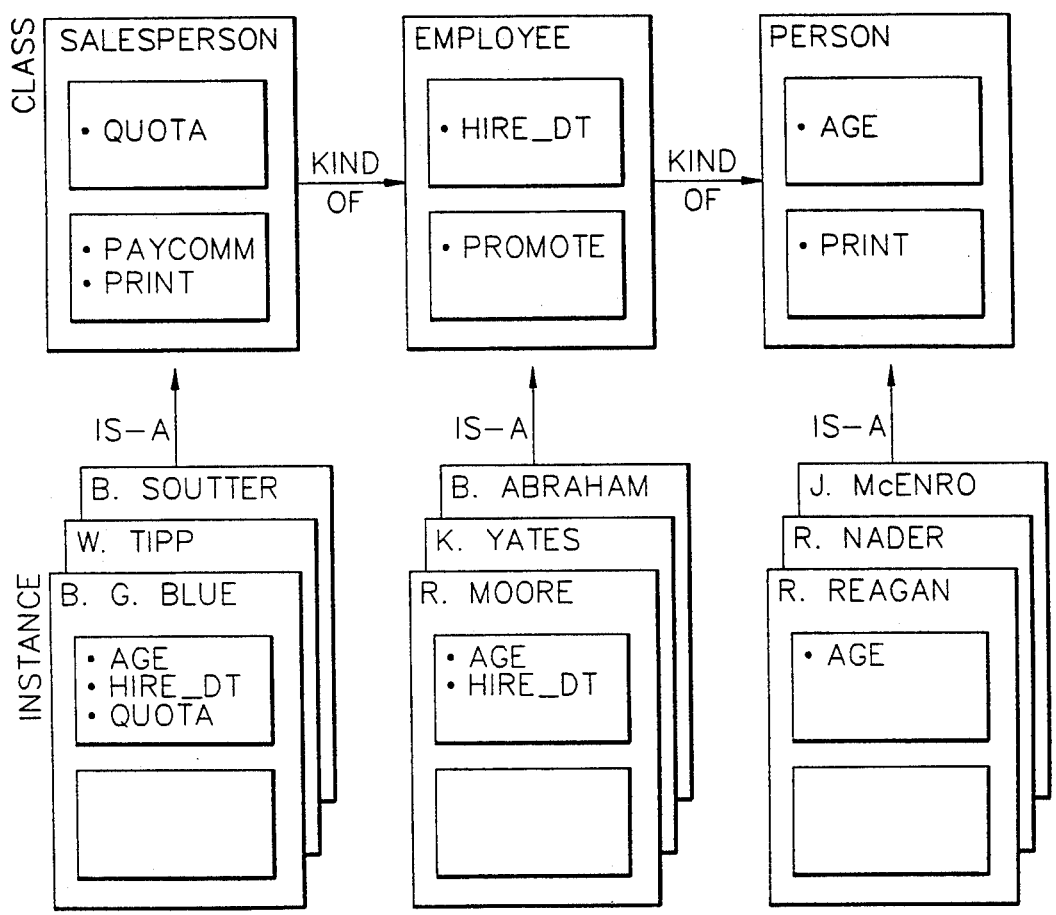
FIG. 3 illustrates the inheritance property of objects.
Figure 6:
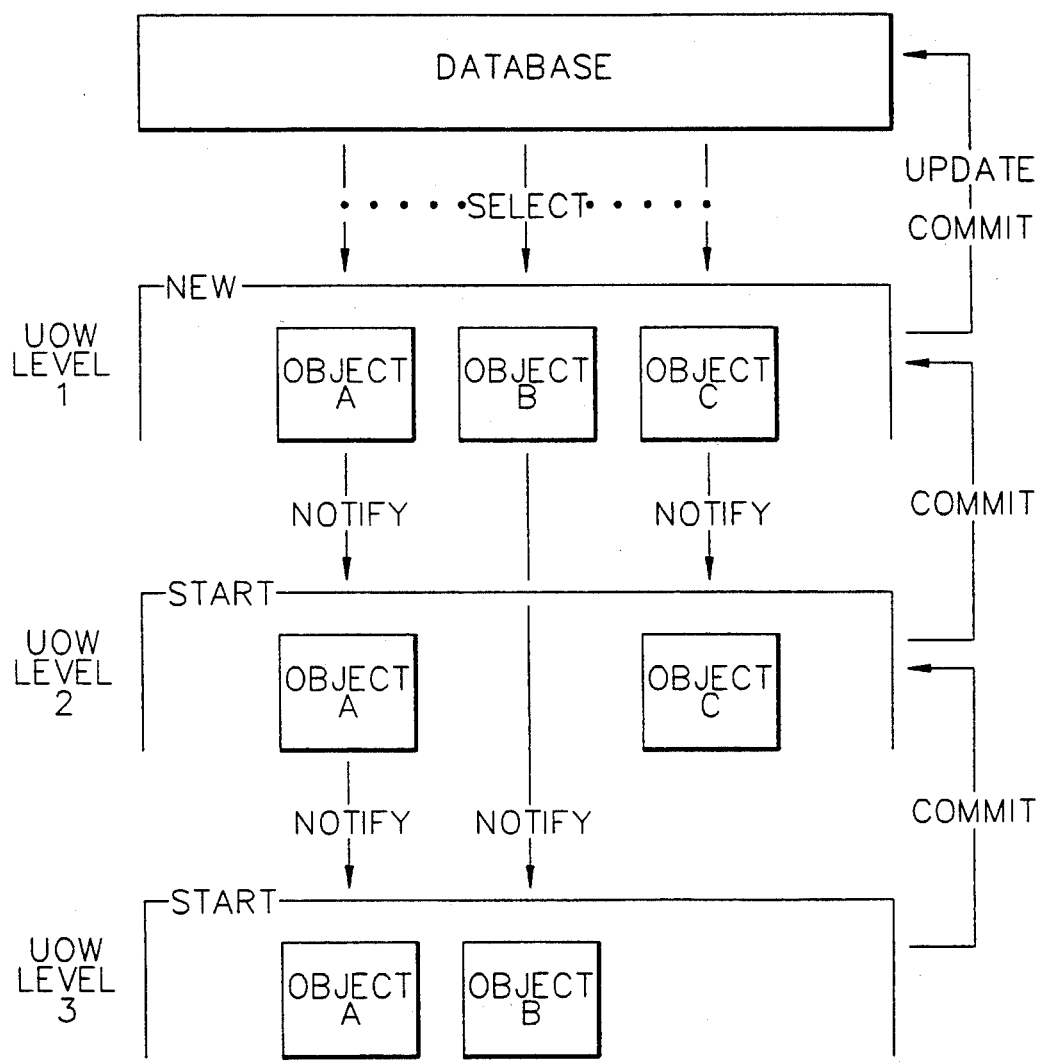
FIG. 6 illustrates a schematic representation of a Unit of Work instance of the present invention, including multiple objects and multiple Unit of Work levels.
Figure 8:
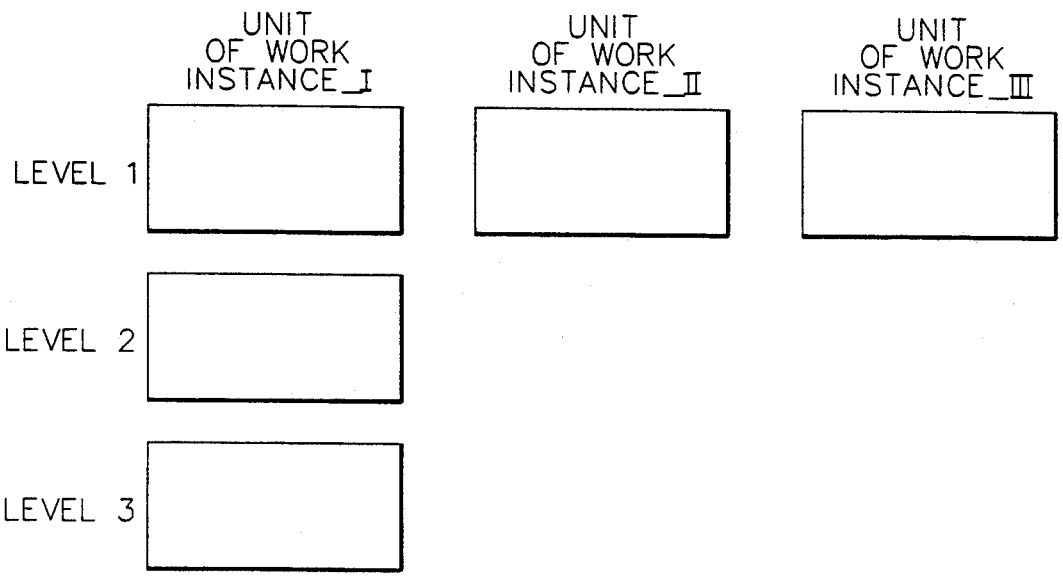
FIG. 8 illustrates multiple Unit of Work instances, according to the present invention.

Referring now to FIG. 6, there are two major uses for the Unit of Work object class of the present invention. The first use is for multiple, concurrent Unit of Work levels for each object. An object table, known as a Unit_Of_Work_Instance_Object_Table, as represented in FIG. 7, exists for each Unit of Work instance. An example of a Unit of Work instance for an object is if Object_A in FIG. 6 were equivalent to Salesperson object in FIG. 3, then the multiple object instances of Salesperson object, i.e. Object_A, would be B. Soutter, W. Tipp, and B. G. Blue. Multiple Unit of Work instances are illustrated in FIG. 8 where Object_A, Object_B and Object_C in FIG. 6 can be represented collectively, as a single Unit of Work instance and Unit of Work Instance_I, Unit of Work Instance_II and Unit of Work Instance_III illustrate three Unit of Work instances in FIG. 8. The second use is for creating Unit of Work levels within a particular Unit of Work instance, respectively referred to in FIG. 6 as UOW Level 1, UOW Level 2 and UOW Level 3.

Multiple Unit of Work instances simply means that two or more Units of Work referred to as Unit of Work Instance_I, Unit of Work Instance_II, and Unit of Work Instance_III in FIG. 8 may exist simultaneously and yet operate independently from each other. This is also true for Objects themselves, such as Object₁₃A, Object_B and Object_C in FIG. 6. This concept allows database commits to occur which only affect one particular Unit of Work instance for Object_A such as Unit of Work Instance_I in FIG. 8. Additionally, multiple Unit of Work instances allow a user to "switch" from Unit of Work instance to Unit of Work instance as desired, i.e. Unit of Work Instance_I to Unit of Work Instance_II. Unit of Work levels 1, 2, and 3 control those Unit of Work related activities within a particular Unit of Work instance. Only actions which commit the lowest level of a particular Unit of Work instance, i.e. level 1, will actually impact the database.

UNIT OF WORK OBJECT CLASS—ATTRIBUTES

The major attributes of the Unit of Work object class of the present invention include:

Unit_of-Work_Instance_ID

Unit_of_Work_Instance_ID uniquely identifies a Unit of Work instance.

Unit_of_Work_Instance_Current_Level

Unit_of_Work_Instance_Current_Level indicates the Unit of Work level for a given Unit of Work instance.

Unit_of_Work_Previous_Instance_ID

Unit_of_Work_Previous_Instance_ID uniquely identifies which instance had control prior to control being transferred to a newly created Unit of Work instance or a switch.

Unit_of_Work_Instance_Object_Table
(Unit_of_Work_Instance_Object_List)

The Unit_of_Work_Instance_Object_Table is maintained for each Unit of Work instance. The two dimensional table contains the objects for the Unit of Work instance and the Unit of Work levels at which the object is found within the Unit of Work instance. One implementation provides columns labelled by object and rows labelled by Unit of Work levels. An address to the instance of an object or an OREF is maintained at the intersection of the particular object column and Unit of Work level row in the table. Where no address or OREF is found, the object is not present at that particular Unit of Work level in the particular Unit of Work instance.

For example, referring to FIG. 7, a Unit_of_Work_Instance_Object_Table is shown for the Unit of Work instance in FIG. 6. Since there is no instance of Object_B at Unit of Work level 2 or Object_C at Unit of Work level 3 in the Unit of Work instance illustrated in FIG. 6, there is correspondingly no entry in the Unit_of_Work_Instance_Object_Table for those objects at those Unit of Work levels.

UNIT OF WORK OBJECT CLASS—METHODS

The Unit of Work object class of the present invention provides seven methods which act on objects in the object oriented environment. These methods include New, Start, Notify, Discard, Switch, Commit and Rollback. Each method manipulates one of the above counters as well as other attributes.

New

The New method begins an entirely new Unit of Work instance and returns a handle to the calling application program. The handle uniquely identifies the new Unit of Work instance. All data referenced within this Unit of Work instance are newly created or selected, even if the data has already been previously selected within another Unit of Work instance. Additionally, when this Unit of Work instance is discarded, all memory associated with any data which have been either selected or created within this Unit of Work instance is also freed.

Start

The Start method tells the Unit of Work instance to begin a new, nested Unit of Work level within the current Unit of Work instance.

Notify

The Notify method permits the application program to tell the Unit of Work Manager that a data element is about to be modified and causes the data element to be "copied into" the current Unit of Work level in the current Unit of Work instance.

Discard

The Discard method removes the specified Unit of Work instance from memory resulting in the loss of data within the Unit of Work instance and no effect on the database.

Switch

The Switch method causes control to leave the current Unit of Work instance and to enter another previously defined Unit of Work instance using the control (handle or unique identifier) returned by the New feature.

Commit

The commit method applies the changes made within the current Unit of Work level indicated by Unit_of_Work_Instance_Current_Level to the preceding Unit of Work level. A commit performed when the Unit of Work level is one, results in a physical update and a commit of the database. The Unit of Work instance which commits successfully will ensure that the update of each data element was successful.

Rollback

The Rollback method destroys changes made within the current Unit of Work level indicated by Unit_of_Work_Instance_Current_Level and returns control to the previous Unit of Work level. If a database operation was unsuccessful, the Unit of Work level is considered to be "un-committable". The database will be rolled back, all data objects will be left in their updated states at Unit of Work level 1 in memory and not copied to the database. The Unit of Work Manager will return control to the calling application program which issued the commit with an error indicating which data element failed the database update and the reason for the failure.

More specifically, referring to FIG. 8, the method New will create a new Unit of Work instance, i.e. Unit of Work Instance_III, for the object specified by the applications program. New has three attributes including a Unit_of_Work_Instance_Current_Level for this Unit of Work instance, a previous Unit of Work instance indicator, Unit_of_Work_Previous_Instance_ID, that indicates which Unit of Work instance had control prior to the new creation, and a list of objects that this newly created Unit of Work instance knows about which can be represented as a table, Unit_of_Work_Instance_Object_Table (FIG. 7). Note that the list will contain at level one, copies of the objects as they appear in the database and the Unit_of_Work_Instance_Current_Level will be set to one since the Unit of Work instance was just created. The operation of New will be further described in the examples for the Commit and Rollback methods.

Figure 9:
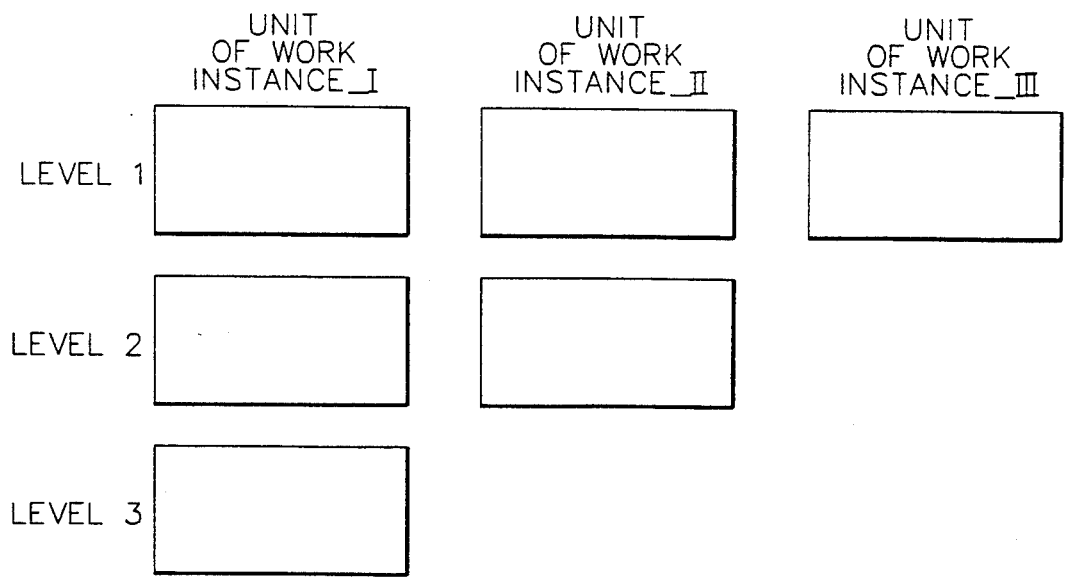
FIG. 9 illustrates multiple Unit of Work instances after the start of a new level according to the present invention.

The method Start creates a new level of work in the currently active Unit of Work instance. There is a Unit_of_Work_Instance_Current_Level for each instance that tells which Unit of Work level within an Unit of Work instance is currently active. This current level indicator in the active instance is incremented. Thus, if Unit of Work Instance_II is the currently active Unit of Work instance, Start_II will cause the Unit of Work manager to create a new Unit of Work level, namely level 2, for Unit of Work Instance_II since its current level is 1. The Unit_of_Work_Instance_Current_Level for this Unit of Work Instance_II is incremented by 1, i.e. from 1 to 2. Control is then passed to the application program which called Start along with the current level value. This new level results in changes to FIG. 8 as reflected in FIG. 9. Operation of Start will be further described in the examples for the Commit and Rollback methods.

The Notify method provides the Unit of Work Manager with an indication from the application program that a data element is to be modified. The level indicated by Unit_of_Work_Instance_Current_Level of the active Unit of Work instance is checked to see if the level has a copy of the data. If a copy does not exist at the current level of the active Unit of Work instance, memory is allocated and a copy of the original object is made at this level. One implementation provides a pointer which is set to point to the previous copy of the object. Operation of Notify will be further described in the examples of the Commit and Rollback methods.

The Discard method removes the currently active Unit of Work instance from memory. This is accomplished by deleting all entries in the object identification table, which has the object identification number and associated address relating to the currently active Unit of Work instance for the particular object. This particular Unit of Work object is removed from the list of objects in the original Unit of Work object. The Unit_of_Work_Instance_Object_Table is also removed from memory. Operation and implementation of the Discard method will be further described in the examples of the Commit and Rollback methods.

The Switch method permits change of control from the currently active Unit of Work instance to a previously defined Unit of Work instance. The method provides three attributes associated with each Unit of Work instance using the Switch method, namely a Unit_of_Work_Instance_Current_Level, an indicator as to what is the previous Unit of Work instance, i.e. Unit_of_Work_Previous_Instance_ID, and a list of objects which the currently active Unit of Work instance is aware, i.e. Unit_of_Work_Instance_Object_Table. Note that switching is only done to the current active level of an instance and not to previous levels of an instance.

Figure 10:
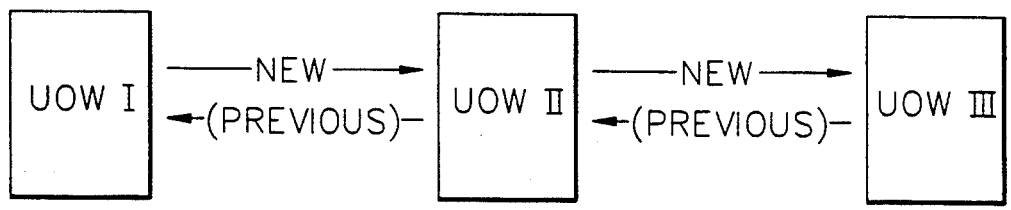
FIGS. 10 through 12 illustrate Units of Work of the present invention before and after implementation of Switch and Discard methods.
Figure 11:
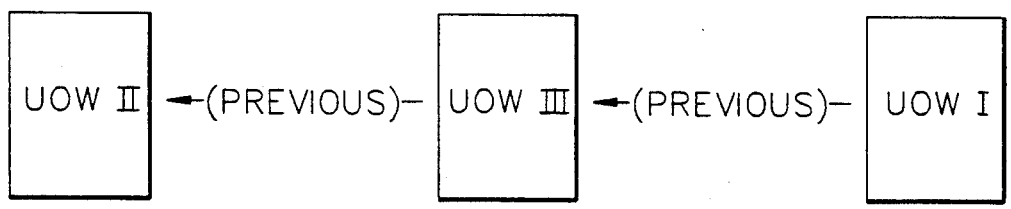

Referring now to FIG. 10, the switch method of the present invention will be further described. In FIG. 10, the Unit of Work instances, namely UOW_I, UOW_II and UOW_III, contain one or more objects and it will be understood that each Unit of Work instance may contain greater than one Unit of Work level. The right most instance, namely UOW_III, is the currently active instance. References to new Unit of Work instances and previous Unit of Work instances are maintained. When the application program executes a Switch to say Unit of Work instance UOW_I, the previously active instance pointer for Unit of Work instance UOW_II is set to the previous active pointer for Unit of Work instance UOW_I, i.e. null, the previously active pointer for Unit of Work instance UOW_I is set to the currently active instance, i.e. points to Unit of Work instance UOW_III, and the currently active instance is set to Unit of Work instance UOW_I. The new pointer for Unit of Work instance UOW_III and UOW_I are respectively set to Unit of Work instance UOW_I and null. Thus, referring to FIG. 11, Unit of Work instance UOW_I is moved from its present position in the list to the end of the list causing pointers to previous instances of work to be adjusted such that UOW_I's previous instance pointer points to UOW_III and UOW_III's previous pointer points to UOW_II.

Figure 12:
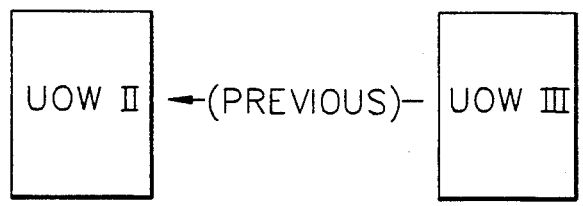

If a Discard A were then executed by the applications program, the indicator which indicates that Unit of Work instance UOW_I was currently active would be adjusted to that which the previous instance pointer of Unit of Work instance UOW_I points to, namely Unit of Work instance UOW_III. The new pointer for Unit of Work instance UOW_III is set to null. All entries in the object identification table for Unit of Work instance UOW_I are deleted. Thus, Unit of Work instance UOW_III is the currently active instance. The result of this Discard method is depicted in FIG. 12.

DETAILED DESCRIPTION OF UNIT OF WORK METHODS

In order to fully describe the operation of the Commit and Rollback methods of the present invention, the operation of these methods will be described in four examples. The operation of the other five methods namely Now, Start, Notify, Discard, and Switch, will appear as part of these examples. Example 1 describes the operation of a Modify method on Object_A and Object_B in two Unit of Work levels within one Unit of Work instance which Commit at the end of each level. Example 2 describes the operation of a Modify method on Object_A and Object_B in two Unit of Work levels within one Unit of Work instance which complete unsuccessfully and therefore Rollback at the end of the level. Example 3 describes the operation of a Modify method on Object_A and Object_B in two Unit of Work levels within one Unit of Work instance where the inner level completes with an error and is rolled back and the outer level completes successfully and is committed. Example 4 describes the operation of a Modify method on Object_A and _B in two Unit of Work levels within one Unit of Work instance where the inner level completes successfully and commits and the outer level completes unsuccessfully and rolls back.

In all examples, the term "database" is used to refer to a nonvolatile data storage device. The terms "RAM" and "memory" are used to refer to a volatile data storage device.

For every Example, assume that there exists two data objects, namely Object_A and Object_B. The attributes of both objects are initialized at the beginning of each example.

Object_A has a numeric attribute, called Field X having the value 100 stored in the physical database.

Object_B has a character array attribute of length 3, called Field Y having the value "ABC" stored in the database.

EXAMPLE 1—COMMIT-COMMIT

In this Example, Object_A and Object_B are modified within two Units of Work, one nested within the other within one Unit of Work instance. The method Modify is carried out using the Unit of Work methods of this invention. For purposes of this illustration, each Unit of Work level will complete successfully and commit at the end. The Commit method is used at the end of each Unit of Work level. This example can be represented in FIG. 13.

Operation of the methods of Unit of Work occurs as already defined and as will be described for the Commit method. A high level program makes a decision to begin a Unit of Work instance. The Unit of Work method New is invoked. New allocates the next Unit of Work instance and passes the handle (unique Unit of Work instance identifier) back to the high level routine. All data within this Unit of Work instance are newly created or selected. A current level counter for this instance (Unit_of_Work_Instance_Current_Level) is declared and set to one. A previous instance counter (Unit_of_Work_Previous_Instance_ID) is declared and set to reference the previous Unit of Work instance which had control.

The high level routine then decides to begin an operation which needs Unit of Work control. This routine invokes the Unit of Work method Start in order to create a new level of work. The Unit of Work Start routine increments the level counter for the active Unit of Work instance (Unit_of_Work_Instance_Current_Level) to two. The Start routine returns control to its caller and passes back the Unit of Work current level value, i.e. level two.

The high level routine then invokes the Modify_A routine for Object_A. The Modify_A routine invokes the Unit of Work Notify routine since it seeks to modify data and passes the identification of that Object_A obtained from the object identification table. The Unit of Work Notify routine checks the Unit_of_Work_Instance_Object_Table to see whether a copy of Object_A exists at the current Unit of Work level (Unit_of_Work_Instance_Current_Level), namely level 2. Since Object_A is not at the Unit of Work level 2, the Unit of Work Notify routine allocates an appropriately sized block of memory and copies the current version of the data into this block. The address or OREF of this block is stored in the Unit_of_Work_Instance_Object_Table for Object_A at level 2. The Unit of Work Notify routine returns control to the Modify_A routine.

Figure 14:
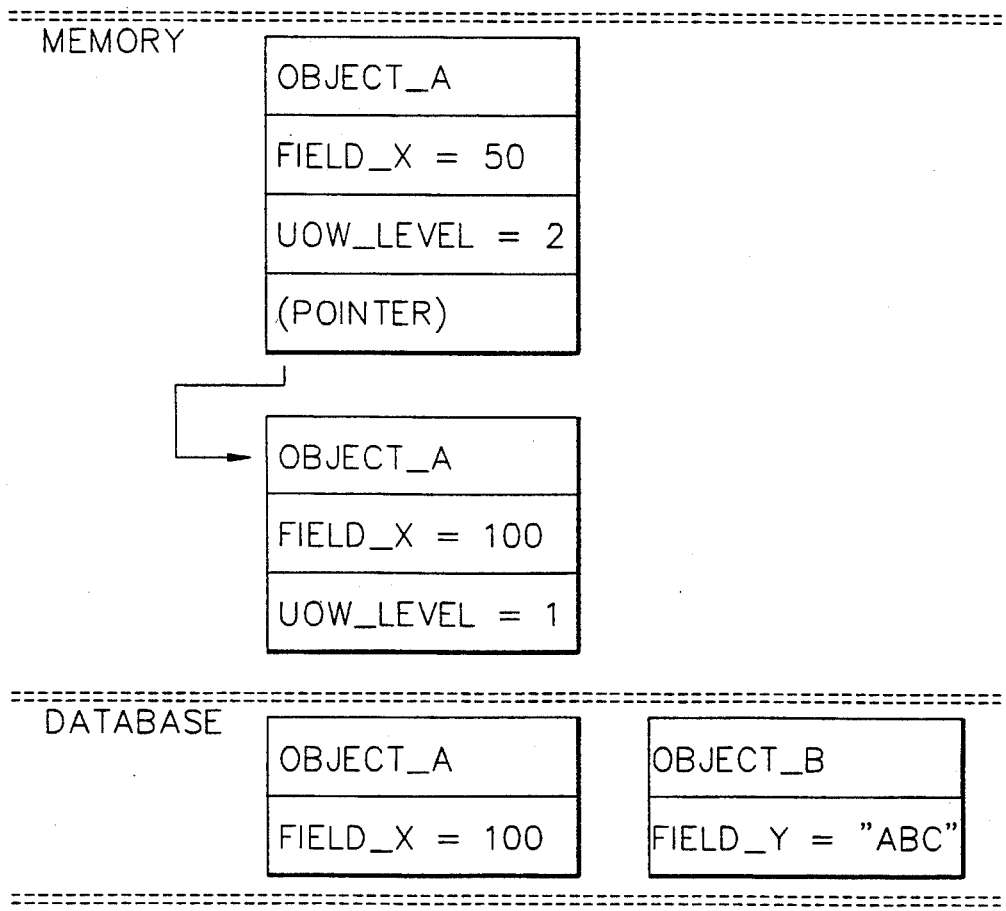
FIGS. 14 through 16 illustrate objects in memory and in a database during buildup of the Unit of Work levels of the present invention.

The Modify_A routine then goes about the task of modifying the data. For example, Field X is set equal to 50. Conceptually, the database and memory can now be viewed as represented in FIG. 14. When Modify_A has completed its Work, control is returned to the invoking high level routine.

The high level routine then invokes the Unit of Work Start routine to indicate that it wishes to begin another, nested Unit of Work level. The Unit of Work Start routine increments the active level counter for the currently active Unit of Work instance (Unit_of_Work_Instance_Current_Level) to three. Start returns control to its caller and passes back the value of the active Unit of Work instance level, i.e. 3.

Figure 13:
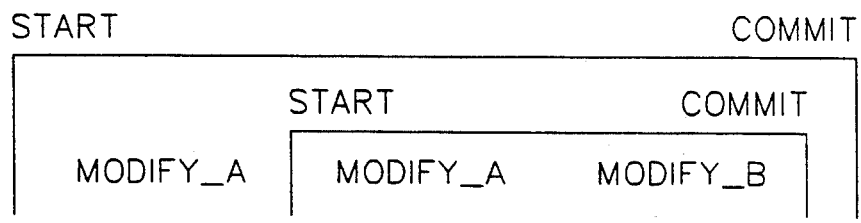
FIG. 13 illustrates a schematic diagram of the operations implemented in a first example of the present invention.

The high level routine then invokes the Modify_A routine for Object_A as depicted FIG. 13. The Modify_A routine invokes the Unit of Work Notify routine since it seeks to modify that data. Modify passes the identification of Object_A obtained from the object identification table to Notify. Notify checks the Unit_of_Work_Instance_Object_Table to see if a copy of Object_A exists at the current Unit of Work level. Since Object_A is not at the current Unit of Work level (Unit_of_Work_Instance_Current_Level), i.e. level 3, Notify allocates an appropriately sized block of memory and copies the current version of Object_A into this block. The address of this block is loaded into the Unit_of_Work_Instance_Object_Table for Object_A at level 3. The Unit of Work Notify routine returns control to the Modify_A routine.

Figure 15:
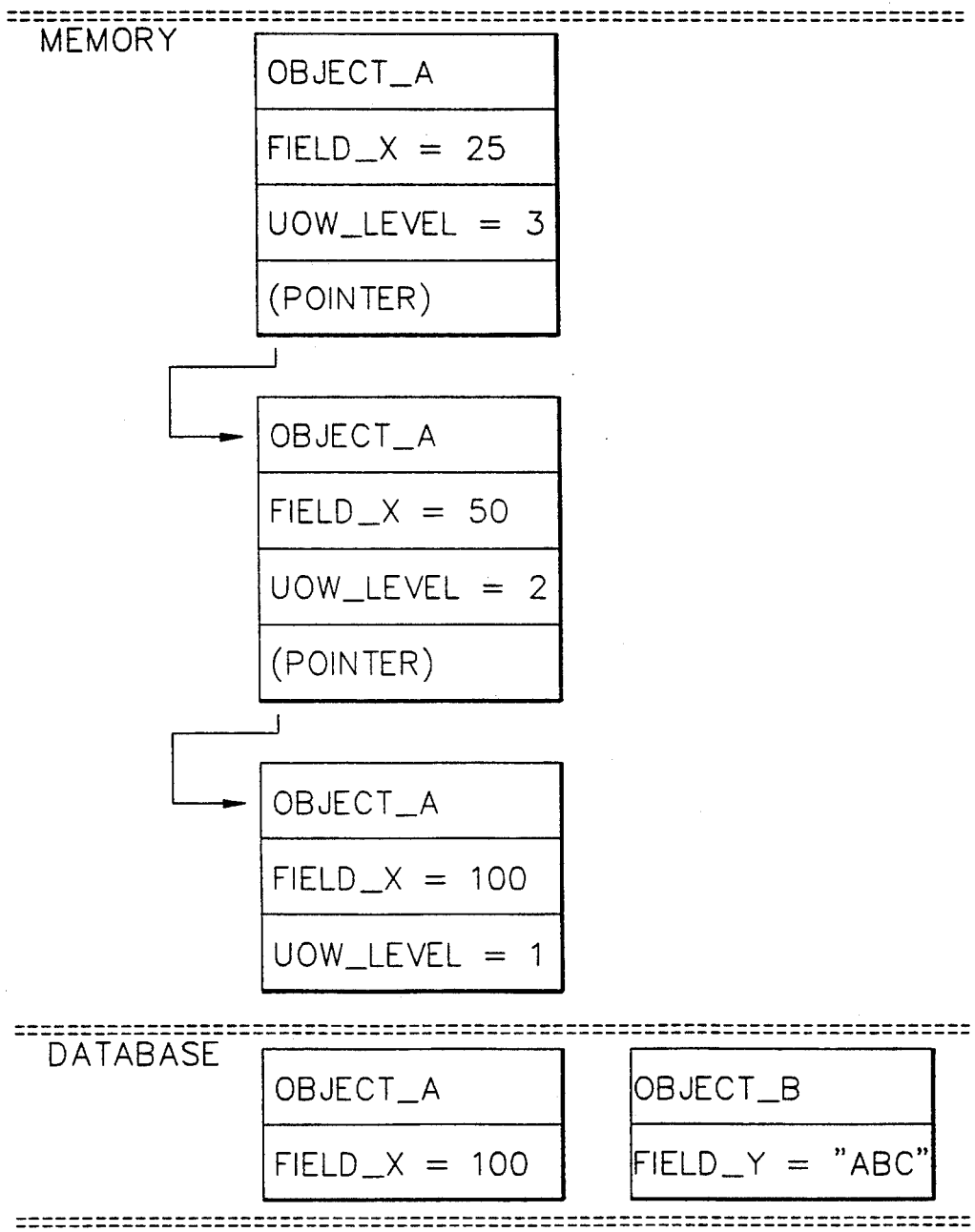

Modify_A then goes about the task of modifying Object_A. For example, Field X is set equal to 25. Conceptually, the database and memory can now be viewed as illustrated in FIG. 15. When Modify_A has completed its task, control is returned to the invoking high level routine.

The high level routine then invokes the Modify_B routine for Object_B. The Modify_B routine in FIG. 13 invokes the Unit of Work Notify routine since it seeks to modify Object_B. Modify passes the identification of Object_B obtained from the object identification table to Notify. The Unit of Work Notify routine checks the Unit_of_Work_Instance_Object_Table to see if a copy of Object_B exists at the current work level (Unit_of_Work_Instance_Current_Level), i.e. level 3. Since Object_B is not at the current Unit of Work level, i.e. level 3, the Notify routine allocates an appropriately sized block of memory. It copies the current version of Object_B from level 1 into this block at level 3. The Unit_of_Work_Instance_Object_Table is updated to reflect the existence and location of the copy of Object_B at level 3. The Unit of Work Notify routine returns control to the Modify_B routine.

Figure 16:
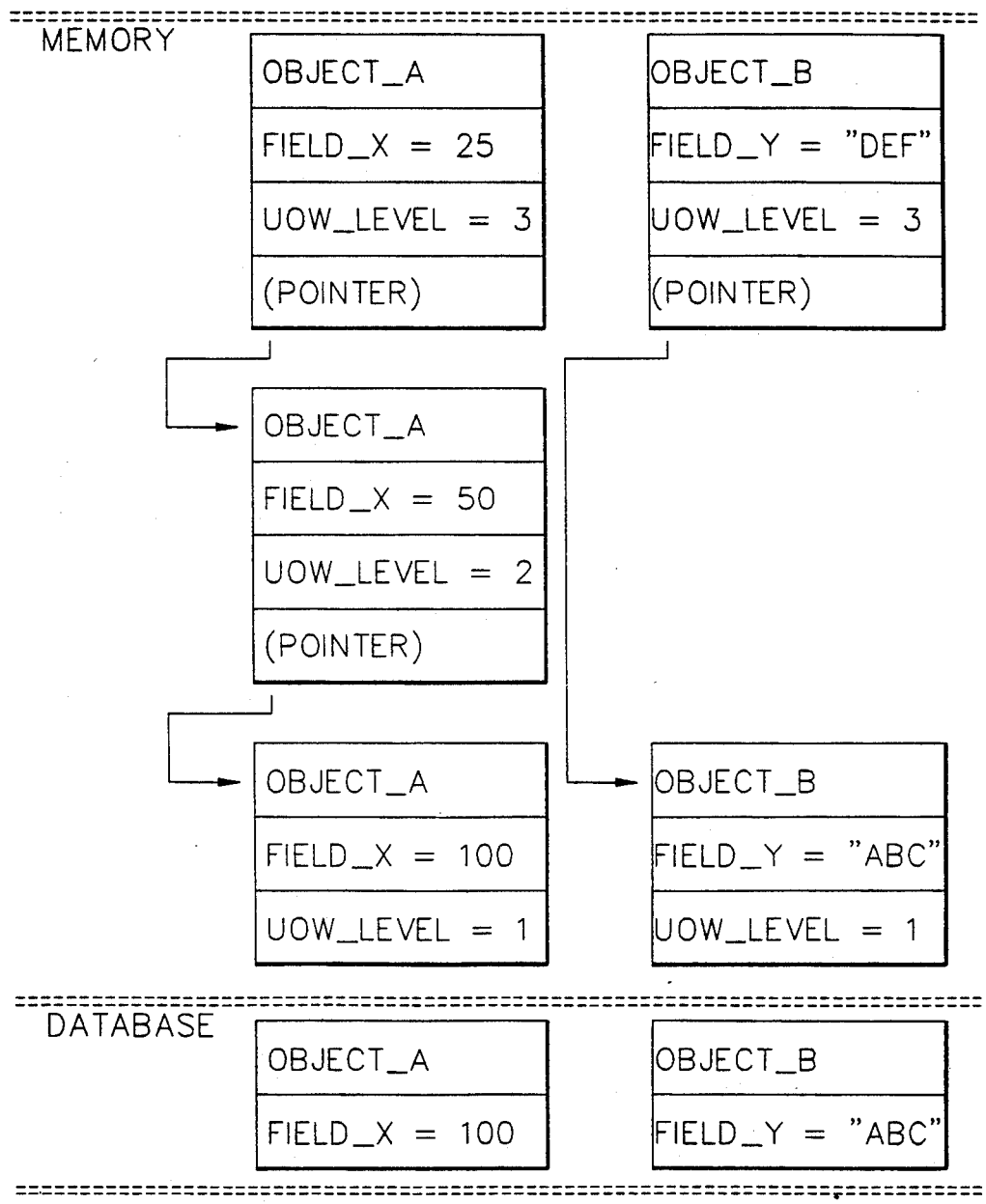

Modify_B then goes about the task of modifying Object_B. For example, Field Y is set equal to "DEF" Conceptually, the database and memory can now be viewed as illustrated in FIG. 16. Notice that no level 2 exists for Object_B. This is a result of no manipulation of Object_B while the current level counter (Unit_of_Work_Instance_Current_Level) equalled two. When the Modify_B routine has completed its task, control is returned to the invoking high level routine.

The high level routine determines that Unit of Work level three completed satisfactorily and invokes the Unit of Work Commit routine. Note that this example assumed successful completion to illustrate Commit. Commit checks the Unit_of_Work_Instance_Object_Table to find all data objects which have a Unit of Work level equal to the current Unit of Work level (Unit_of_Work_Instance_Current_Level). Since the current level is three, both Object_A and Object_B are found at level three. A check is made to see if a copy of each object resides at the level previous to the current level. In this case, a check is made to see if a copy of Object_A and Object_B exists at level two. Since a copy of Object_A exists at level two, the Unit of Work commit routine will remove Object_A at level two from memory, and establish Object_A from level three as currently "active" at level two. Thus, the contents of the Unit_of_Work_Instance_Object_Table at Object_A and level 2 is replaced with that from level 3. Since Object_B does not have a copy in memory at Unit of Work level two, Commit will change Object_B's Unit of Work level from three to two. Thus, the contents of the Unit_of_Work_Instance_Object_Table at Object_B, level 3 is moved to level 2.

Figure 17:
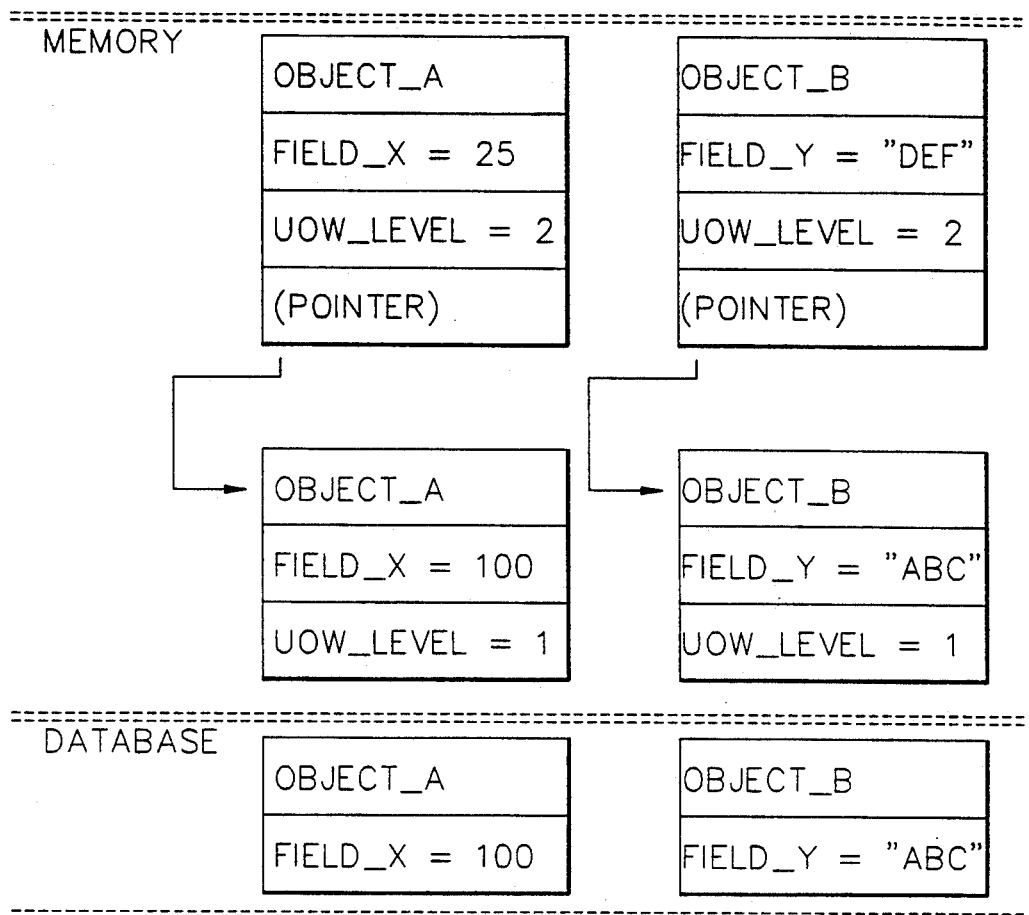
FIGS. 17 and 18 illustrate objects in memory and in a database during a first example of the present invention.

The Unit of Work Commit routine subtracts one from the Unit of Work level counter (Unit_of_Work_Instance_Current_Level). The new Unit of Work level is now two. The Unit of Work Commit routine returns control to the high level routine. Conceptually, the database and memory can now be viewed as illustrated in FIG. 17 in which the previous level has been overlaid with the current level.

The high level routine determines that Unit of Work level two completed satisfactorily and invokes the Unit of Work Commit routine. Note that this example assumed successful completion to illustrate Commit. The Unit of Work Commit routine checks the Unit_of_Work_Instance_Object_Table to find all data objects in existence at the current Unit of Work active level (Unit_of_Work_Instance₁₃Current_Level). Since the current level is two, both Object_A and Object_B are found. When the currently active level is two, Commit will attempt to update the database. Since the Unit of Work level value (Unit_of_Work_Instance₁₃Current_Level) in the example is two, Commit will attempt to update the database with the new data found in Object_A and Object_B at level two. It will then issue the appropriate database query language Command so that the changes will be physically applied to the database. Assume for purposes of this example that the database updates are successful.

At this point, the Unit of Work Commit routine will release Object_A and Object_B at level one from memory, set the level indicators for Object_A and Object_B at level two to level one, and establish Object_A and Object_B as currently "active". The contents of Unit_of_Work_Instance_Object_Table at Object_A, level 1, and Object_B, at level 1 are updated by respectively replacing them with the contents from Object_A, level 2 and Object_B, level 2.

Figure 18:
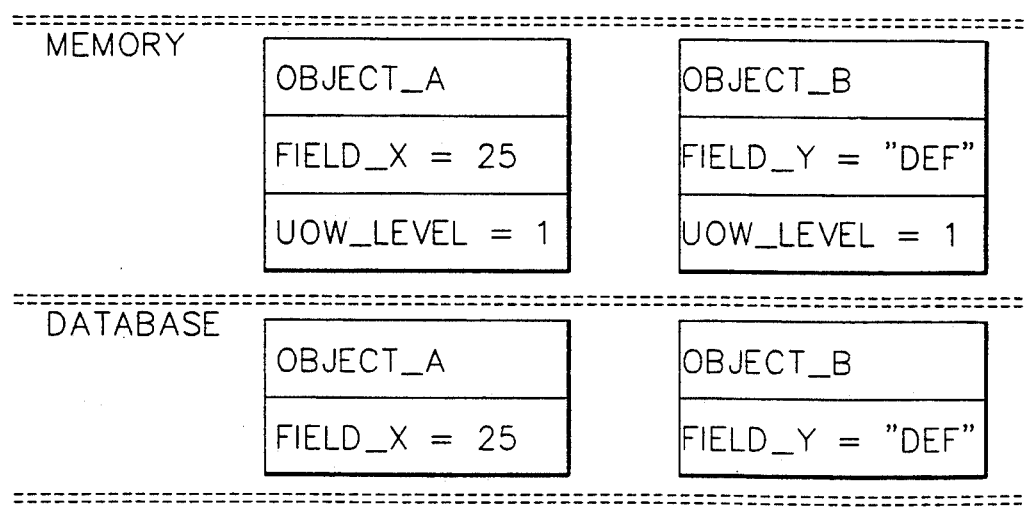

The Unit of Work Commit routine subtracts one from the Unit of Work current level counter (Unit_of_Work_Instance$_{13}$Current_Level). Thus, the currently active level counter for this instance is now one. The Unit of Work Commit routine then returns to the high level routine. Conceptually, the database and memory can now be viewed as illustrated in FIG. 18.

The high level routine then issues a Discard to remove the Unit of Work instance. Thus, identification of Object_A and Object_B will be deleted from the object identification table in memory. The Unit of Work level one is also removed from memory. The Unit_of_Work_Instance_Object_Table for this Unit of Work instance is deleted from memory. The database remains as depicted in FIG. 18. The high level routine then terminates and returns to its caller.

EXAMPLE 2—ROLLBACK-ROLLBACK

As a second example, Object_A and Object_B will be modified within two Unit of Work levels, one nested within the other all within one Unit of Work instance. For purposes of this illustration, each Unit of Work level will complete unsuccessfully. Therefore, Rollback will occur at the end of each nest. This example can be represented as seen in FIG. 19.

A high level routine in an application program makes a decision to begin a Unit of Work instance. The Unit of Work New method is invoked. A current level counter (Unit_of_Work_Instance$_{13}$Current_Level) for the new instance is declared and initialized to one. A previous Unit of Work instance indicator (Unit_of_Work_Previous_Instance_ID) is declared and set to reference the instance which previously had control. New also declares a list to store the objects this instance knows about. This list can be represented as a table, Unit_of_Work_Instance_Object_Table, and contains the addresses of the object at the different levels. The objects from the database are copied into the table (list) at level one. New allocates the next Unit of Work handle (unique identifier) and passes it back to the high level routine. The high level routine decides to begin an operation which needs Unit of Work control. This routine invokes the Unit of Work Start routine. Start creates a new level of work in this currently active instance. Start increments the current Unit of Work level counter by one. Thus, the currently active level (Unit_of_Work_Instance$_{13}$Current_Level) in this instance is two. The Unit of Work Start method returns control to its caller and passes back the Unit of Work current level counter value which is two.

Figure 19:
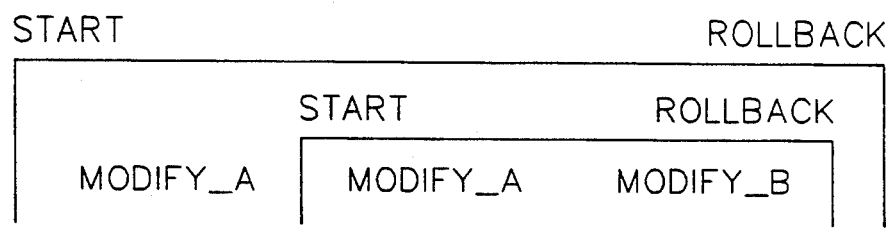
FIG. 19 illustrates a schematic diagram of the operations implemented in a second example of the present invention.

The high level routine then invokes the Modify_A method for Object_A as represented in FIG. 19. Since the Modify_A seeks to manipulate data, it invokes the Unit of Work Notify method which indicates to the Unit of Work Manager that Object_A is to be modified. Modify passes the identification of Object_A which it will be modifying. This is obtained from the object identification table. The Unit of Work Notify method checks the Unit_of_work_Instance_Object_Table to see whether a copy of Object_A exists at the current Unit of Work level (Unit_of_Work_Instance$_{13}$Current_Level). Since Object_A is not at the current Unit of Work level for this instance, i.e. level two, Notify method allocates an appropriately sized block of memory. Notify then copies the current version of Object_A from level one into this block at level two. The Unit_of_Work_Instance_Object_Table at Object_A, level 2 is loaded with the address of this block. The Unit of Work Notify routine returns control the Modify_A routine.

The Modify_A method then modifies the data. For example, Field X is set equal to 50. Conceptually, the database and memory can be represented as illustrated in FIG. 14. When Modify_A has completed its modifying of the data, control is returned to the invoking high level routine.

The high level routine then invokes the Unit of Work Start method to indicate that it wishes to begin another, nested Unit of Work instance. Start creates a new level of work in the current Unit of Work instance. The Unit of Work Start method increments the current level counter for this instance (Unit_of_Work_Instance$_{13}$Current_Level) to three. Start returns control to its caller and passes back the current Unit of Work level counter's value, i.e. level three.

The high level routine then invokes the Modify_A method for Object_A. Modify_A invokes the Unit of Work routine and passes Object_A's identification. It obtains the identification of Object_A from the object identification table and passes it to Notify. The Unit of Work notify method checks the Unit_of_Work_Instance_Object_Table to see whether a copy of Object_A exists at the current Unit of Work level (Unit_of_Work_Instance$_{13}$Current_Level), i.e. level three. This is determined by whether an entry (address) exist in the Unit_of_Work_Instance_Object_Table for Object_A at level 3. Since Object_A is not at the current Unit of Work level (Unit_of_Work_Instance$_{13}$Current_Level), Notify allocates an appropriate sized block of memory. The current version of Object_A from level two is copied into this block at level three. The address of this block is loaded into the Unit_of_Work_Instance_Object_Table at Object_A, level 3. The Unit of Work Notify method returns control to the Modify_A method.

Modify_A then modifies Object_A. For example, Field X is set equal to 25. Conceptually, the database and memory can now be represented as illustrated in FIG. 15. When Modify_A has completed its task, control is returned to the invoking high level routine.

The high level routine then invokes the Modify_B method for Object_B. Modify_B invokes the Unit of Work Notify method in order to indicate to the Unit of Work Manager that Object_B is to be modified. Modify gets the identification of Object_B from the object identification table and passes it to Notify. The Unit of Work Notify method checks the Unit_of_Work_Instance_Object_Table to see whether a copy of Object_B exists at the current Unit of Work level, i.e. level three. Since Object_B is not at the Unit_of_Work_Instance_Current_Level, Notify allocates an appropriately sized block of memory. Notify then copies the current version, i.e. the version from level one, into this block at level three. The address of this block is loaded into Unit_of_Work_Instance_Object_Table at Object_B, level 3. The Unit of Work Notify method returns to the Modify_B method.

Modify_B then modifies Object_B. For example, Field Y is set equal to "DEF". Conceptually, the database and memory can now be represented as illustrated in FIG. 16. When the Modify_B method has completed its task, control is returned to the invoking high level routine.

The high level routine determines that Unit of Work level three completed unsatisfactorily and invokes the Unit of Work Rollback method. Note that unsatisfactory completion was assumed to illustrate Rollback. The Unit of Work Rollback routine finds all data objects in existence at current Unit_of_Work_Instance_Current_Level, i.e. level three. This is accomplished by finding all objects with entries at this level in the Unit_of_Work_Instance_Object_Table. In this example, both Object_A and Object_B have level indicators equal to level three.

If a copy of the object exists at the level one below the current level, the current level is deleted and the level below is made currently active. If a copy does not exist at one level below the current level, the copy at the current level is deleted and the next lowest existing copy is made currently active. Since Object_A has a copy in memory at Unit of Work level two, the Unit of Work Rollback method will release the memory for Object_A at level three, and establish Object_A at level two as currently "active". Thus, the entry in the Unit_of_Work_Instance_Object_Table at Object_A, level 3 is deleted. Since Object_B does not have a copy in memory at Unit of Work level two, the Rollback method will release the memory from Object_B at level three and establish Object_B at level one as currently "active". Thus, the entry in the Unit_of_Work_Instance_Object_Table at Object_B, level 3 is deleted.

Figure 20:
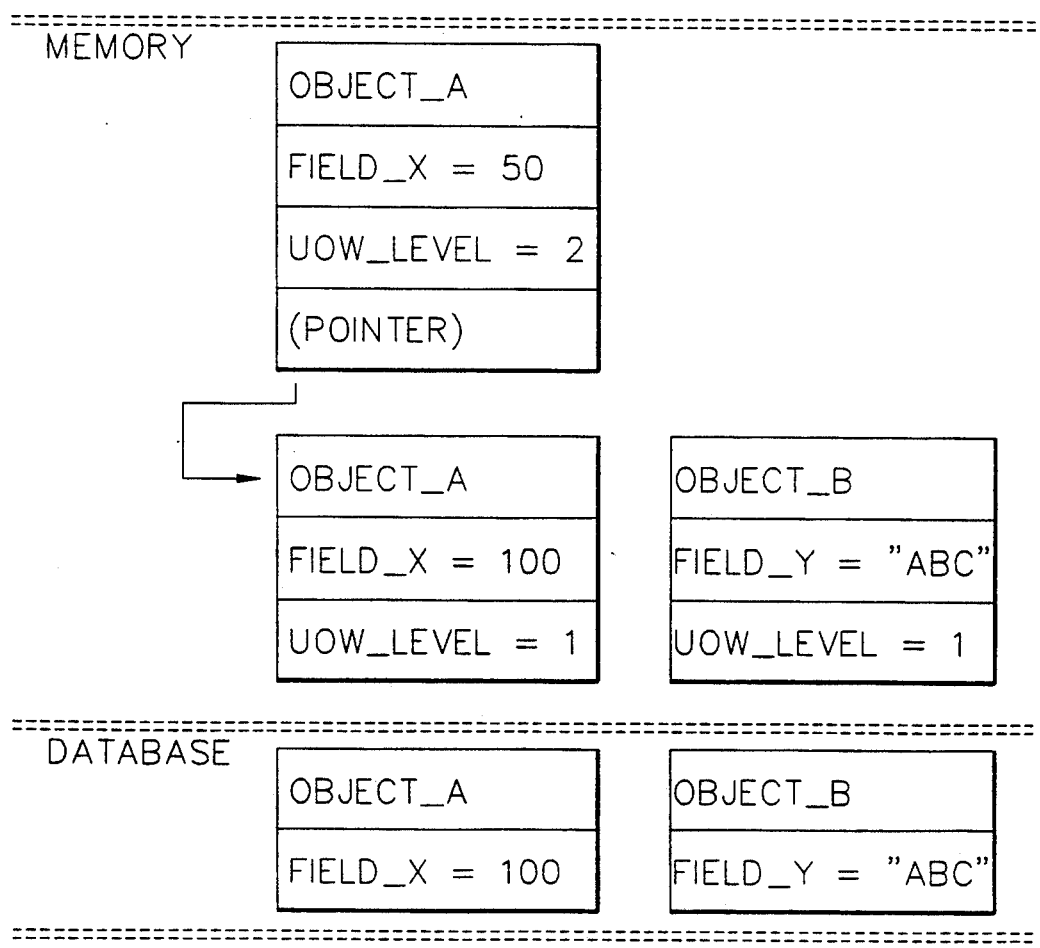
FIGS. 20 and 21 illustrate objects in memory and in a database during a second example of the present invention.

Rollback then subtracts one from the Unit of Work current level counter (Unit_Of_Work_Instance_Current_Level). The new current Unit of Work level is now two. The Unit of Work Rollback method returns control to the high level routine. Conceptually, the database and memory can now be represented as illustrated in FIG. 20.

Figure 21:
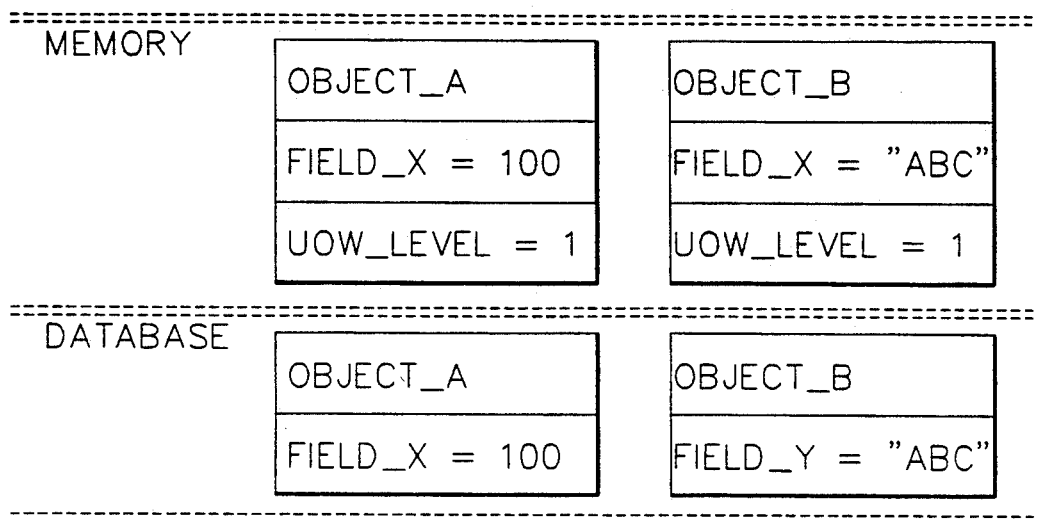

The high level routine determines that Unit of Work level two completed unsatisfactorily and therefore invokes the Unit of Work Rollback routine. Note that unsatisfactory completion was assumed to illustrate Rollback. The Unit of Work Rollback routine finds all data objects in existence at the current Unit of Work level (Unit_of_Work_Instance$_{13}$Current_Level), for this instance, i.e. level two. This is determined by finding all objects in the Unit_of_Work_Instance_Object_Table having entries at level two. In this example, only Object_A is present at level two. Consistent with the operation of Rollback, memory for Object_A at level two is released and Object_A at level one is set to active. Thus, the entry in the Unit_of_Work_Instance_Object_Table for Object_A at level two is deleted. Nothing occurs to Object_B since its active level is one, i.e. there is no entry in the Unit_of_Work_Instance_Object_Table at Object_B, level two. Rollback then subtracts one from Unit_of_Work_Instance_Current_Level for this instance. Thus, the current Unit of Work level is one. The Unit of Work Rollback routine then returns to the high level routine. Conceptually, the database and memory can be represented as illustrated in FIG. 21.

The high level routine then issues a Discard to remove the Unit of Work instance. The objects and their attributes are deleted from memory including all tables. Therefore, only the database remains as in FIG. 21. Furthermore, as a result of the Rollbacks, the database is unchanged. The high level routine then terminates and returns control to its caller.

EXAMPLE 3—ROLLBACK-COMMIT

Figure 22:
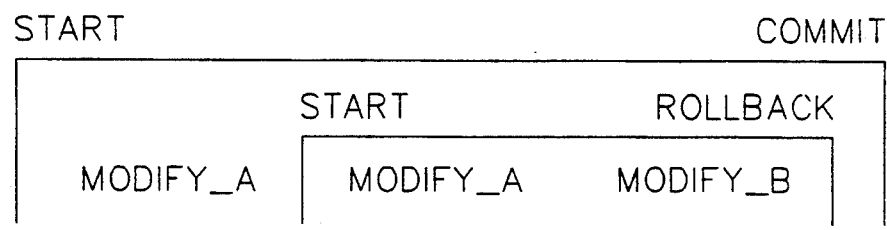
FIG. 22 illustrates a schematic diagram of the operations implemented in a third example of the present invention.

As a third example, Object_A and Object_B will be modified within two Unit of Work levels, one nested within the other, in one Unit of Work instance. For illustration purposes, the inner Unit of Work level will experience an error and complete with a Rollback. The outer level will complete successfully and Commit at the end. This example can be represented graphically as depicted in FIG. 22.

The buildup of the frames is the same as in Examples 1 and 2 and as illustrated in FIGS. 1-16. Therefore, it is not duplicated here. Once the frame levels have been built, they can be illustrated as shown in FIG. 16.

The high level routine determines that Unit of Work level three completed unsatisfactorily. Note that completion was assumed to be unsatisfactory in order to illustrate Rollback. Therefore, the high level routine invokes the Unit of Work Rollback method. The Unit of Work Rollback method finds all data objects in existence at the current Unit of Work level (Unit_of_Wor_k_Instance$_{13}$Current_Level), i.e. level three. This is determined by finding all objects with entries in the Unit_of_Work_Instance_Object_Table at level 3. As illustrated in FIG. 16, both Object_A and Object_B have Unit of Work level indicators equal to three. All data objects at the level below the current level for each object will maintain their state. All data objects at the current active level are deleted. This is accomplished by deleting all entries in the Unit_Of_Work_Instance_Object_Table at level 3. The Unit of Work Instance Current Level for this instance is decreased by one. Since Object_A has a copy in memory at Unit of Work level two, the Unit of Work Rollback method releases the memory for Object_A at level three, and establishes Object_A at level two as currently "active". Since Object_B does not have a copy in memory at Unit of Work level two, the Rollback method releases the memory for Object_B at level three and establishes Object_B at level one as currently "active". Note that nothing occurs to level two for Object_B because Object_B has no presence at level two.

Figure 23:
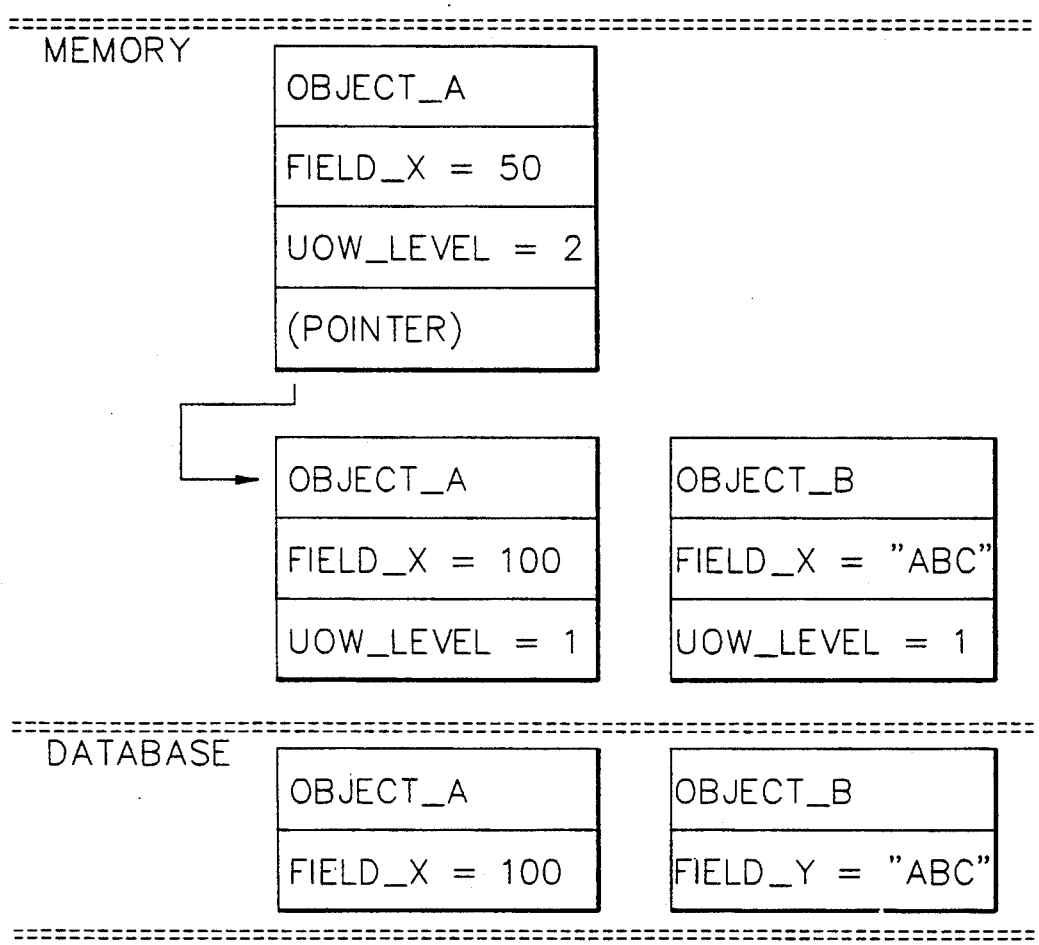
FIGS. 23 and 24 illustrate objects in memory and in a database during a third example of the present invention.

Rollback subtracts one from the Unit_of_Work_Instance_Current_Level for this instance. The current Unit of Work instance level is now two. The Unit of Work Rollback method returns control to the high level method. Conceptually, the database and memory can be represented as illustrated in FIG. 23.

The high level routine determines that Unit of Work level two completed satisfactorily and invokes the Unit of Work Commit method. Note that this was assumed in order to illustrate Commit. The Unit of Work Commit routine finds all data objects in existence of the current Unit of Work level (Unit_of_Work_Instance$_{13}$Current_Level), i.e. level two, for this instance. This is accomplished by finding all objects with entries in the Unit_of_Work_Instance_Object_Table at level two. Since the currently active level is two, only Object_A appears at level two. When the currently active level is two, Commit will attempt to update the database. The Unit of Work Commit method will attempt to update the database with the new data found in Object_A. It then issues the appropriate database query language command so that the changes will be physically applied to the database. Assume for purposes of this example that the database updates are successful.

Figure 24:
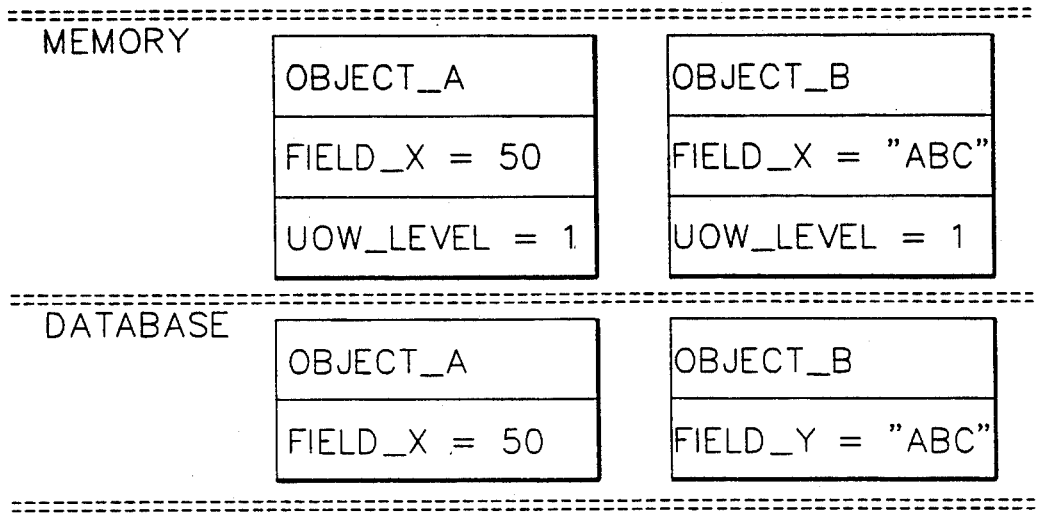

The Unit of Work Commit method will copy Object_A at level two over Object_A at level one, release the memory for Object_A at level one, and establish level one for Object_A as currently active. This is accomplished by replacing the entry in the Unit_of_Work_Instance_Object_Table at Object_A, level 1 with that from Object_A, level 2. The Unit of Work Commit routine subtracts one from the Unit_of_Work_Instance_Current_Level for this instance. This counter is now equal to one. The Unit of Work Commit routine then returns control to the high level routine. Conceptually, the database and memory can be represented as illustrated in FIG. 24.

The high level routine then issues a Discard to remove the Unit of Work instance. Thus, the identification of Object_A and Object_B are deleted from the object identification table in memory. The objects, namely Object_A and Object_B, at level one are also removed from memory. The Unit_of_Work_Instance_Object_Table is deleted. The database remains as illustrated in FIG. 24, having been updated. The high level routine then terminates and returns control to its caller.

EXAMPLE 4—COMMIT-ROLLBACK

Figure 25:
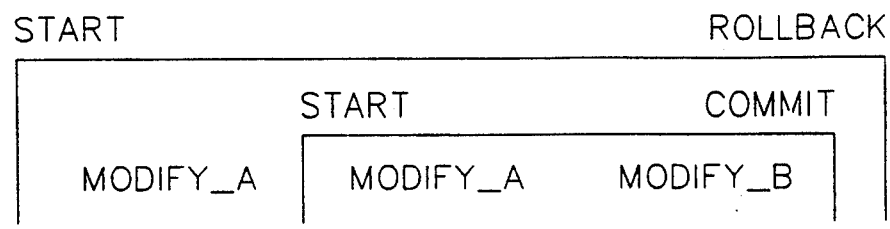
FIG. 25 illustrates a schematic diagram of the operations implemented in a fourth example of the present invention.

As a fourth example, Object_A and Object_B are modified within two Units of Work, one nested within the other, in one Unit of Work instance. For illustration purposes, the innermost Unit of Work will complete successfully and Commit. The outermost will be unable to complete successfully and therefore will Rollback at the end. This example can be represented as illustrated in FIG. 25.

The buildup of the frames is the same as in Examples 1 and 2 and as illustrated in FIGS. 14-16. Therefore, it is not duplicated here. Once the frame levels have been built, they can be illustrated as shown in FIG. 16.

The high level routine determines that Unit of Work level three completed satisfactorily. Satisfactory completion was assumed for illustration purposes. The Unit of Work Commit method is invoked. The Unit of Work Commit method finds all data objects in existence at Unit_of_Work_Instance_Current_Level, i.e. level 3. This is accomplished by finding all objects with entries in the Unit_of_Work_Instance_Object_Table at level 3. Since the current level counter is three, both Object_A and Object_B are found. Commit copies the objects residing at the current level to the level which is one less than the current level.

Figure 26:
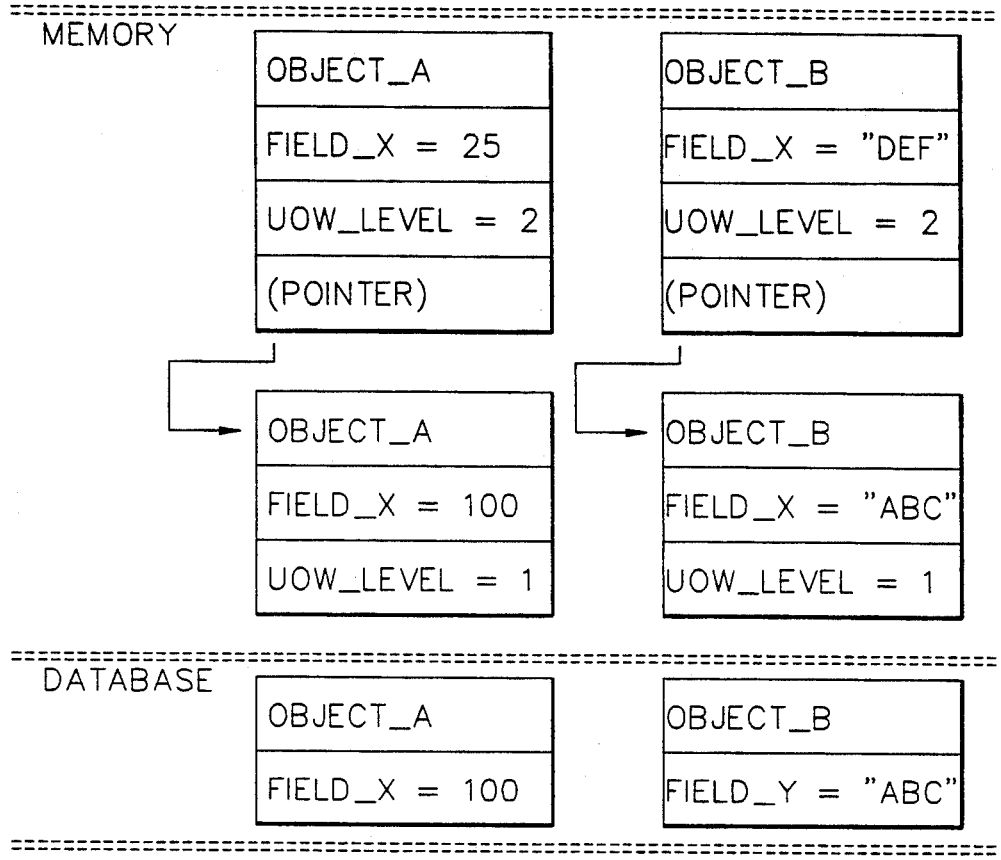
FIGS. 26 and 27 illustrate objects in memory and in a database during a fourth example of the present invention.

The Unit of Work Commit method copies Object_A at level three over Object_A at level two. Commit then releases the memory for Object_A at level three and establishes Object_A at level two as currently "active". This is accomplished by replacing the entry in the Unit_of_Work_Instance_Object_Table at Object_A, level 2 with that from Object_A, level 3 and deleting that at Object_A, level 3. Since Object_B does not have a copy in memory at Unit of Work level two, Commit sets Object_B's Unit of Work active level to two. In other words, it copies Object_B at level three into level two by simply setting the level indicator for Object_B at level two to two. This is accomplished by setting the contents of Unit_of_Work_Instance_Object_Table at Object_B, level 2 equal to that at Object_B, level 3 and deleting that at Object_B, level 3. The Unit of Work Commit routine subtracts one from the Unit_of_Work_Instance_Current_Level. Since the level was three, it is now two. The Unit of Work Commit routine returns control the high level routine. Conceptually, the database and memory can be represented as illustrated in FIG. 26.

The results of this copying can be achieved in an alternative fashion. The same result is reached by setting the pointer for Object_A at level three to the value of the pointer for Object_A at level two, i.e. pointing to Object_A at level one. The level counter for Object_B at level three is changed to level two. The memory for Object_A and its attributes at level two is released.

The high level routine determines that Unit of Work level two completed unsatisfactorily and invokes the Unit of work Rollback method. This was assumed for purposes of this example. The Unit of Work Rollback method finds all data objects in existence at Unit_of_Work_Instance_Current_Level, i.e. level two, for this instance. This is accomplished by finding all objects having entries at level two in the Unit_of_Work_Instance_Object_Table. Since the current level counter is two, both Object_A and Object_B are found at level two.

The Rollback method releases the memory for Object_A and its attributes at level two and establishes Object_A at level one as active. Rollback also releases memory for Object_B and its attributes at level two and establishes Object_B at level one active. This is accomplished by deleting the entries for Object_A and Object_B at level two in the Unit_of_Work_Instance_Object_Table. The Unit of Work Rollback method then subtracts one from the Unit_of_Work_Instance_Current_Level for this instance. Since the current level counter was two, it is now one. The Unit of Work Rollback method then returns control to the high level routine. Conceptually, the database and memory can be represented as illustrated in FIG. 27.

The high level routine then issues a Discard to remove the currently active Unit of Work instance from memory. All entries in the object identification table including object identification numbers and associated addresses relating to this currently active instance for Object_A and Object_B are deleted. The Unit_of_Work_Instance_Object_Table for this Unit of Work instance is also deleted. This particular Unit of Work instance, if it is an object itself, is removed from the list of objects in the original Unit of Work object list, i.e. the object list of the calling Unit of Work (parent).

Figure 27:
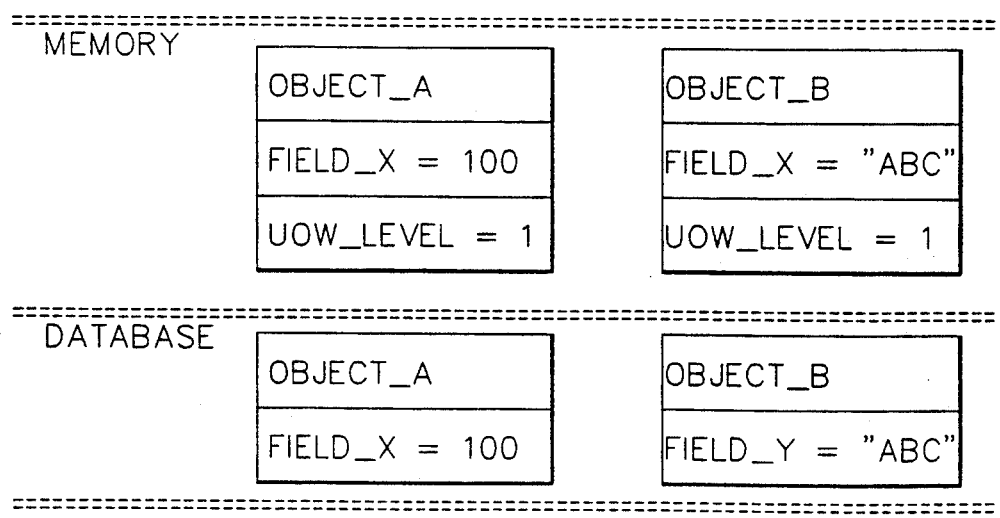

As a result of this example, the database remains unchanged and can be represented as illustrated in FIG. 27. Note that Object_A and Object_B in memory at level one do not exist after Discard. Only the database exists in this example after Discard. The high level routine then terminates and returns control to its caller.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. An object management system for an object oriented computing system executing on a data processing system, said object oriented computing system including a plurality of objects which are stored in nonvolatile storage and which are processed in volatile storage, each object including an object frame containing data attributes, and at least one object method for performing actions on the associated object, said object management system comprising:

a unit of work object class including a unit of work object frame containing pointers to objects which are processed together by said object oriented computing system, and including a first method for loading said objects which are processed together from nonvolatile storage to volatile storage, a second method for storing said objects which are processed together from volatile storage to nonvolatile storage, and a third method for generating in volatile storage a copy of said objects which are processed together in volatile storage, said unit of work frame further including pointers to said copy of said objects which are processed together; and means, responsive to a request to process selected ones of said plurality of objects together, for generating an instance of said unit of work object class, said instance of said unit of work object class including a pointer to each selected object, such that said selected objects are loaded from nonvolatile storage to volatile storage by invoking said first method on said instance of said unit of work object class, and said selected objects are stored in nonvolatile storage after processing by invoking said second method on said instance of said unit of work object class; and means responsive to completion of a first step of said plurality of steps on said selected objects, for generating a copy of said selected objects in volatile storage, in modified condition from said first step, by invoking said third method, such that said second step is performed on said copy of said selected objects in nonvolatile storage.

2. The object management system of claim 1 wherein said unit of work object frame includes a unit of work instance object table having pointers to said objects which are processed together.

3. The object management system of claim 1 wherein said unit of work object frame further includes a unit of work instance object table having pointers to said objects which are processed together and to said copy of said objects which are processed together.

4. An object oriented computing system, comprising:
data processing means;
nonvolatile storage means connected to said data processing means;
volatile storage means connected to said data processing means;
a plurality of objects which are stored in said nonvolatile storage means and which are processed in said frame containing data attributes, and at least one object method for performing actions on the associated object;
said plurality of objects including a unit of work object class having a unit of work object frame containing pointers to objects which are processed together by said object oriented computing system, and including a first method for loading said objects which are processed together from said nonvolatile storage means to said volatile storage means, and a second method for storing said objects which are processed together from said volatile storage means to said nonvolatile storage means; and means, responsive to a request to process selected ones of said plurality of objects together, for generating an instance of said unit of work object class, said instance of said unit of work object class including a pointer to each selected object, such that said selected objects are loaded from said nonvolatile storage means to said volatile storage means by invoking said first method on said instance of said unit of work object class, and said selected objects are stored in said nonvolatile storage means after processing by invoking said second method on said instance of said unit of work object class;

wherein said objects which are processed together are processed in a plurality of steps;

said unit of work object class further including a third method of generating in said volatile storage means a copy of said objects which are processed together in said volatile storage means, said unit of work object frame further including pointers to said copy of said objects which are processed together;

said object management system further comprising means responsive to completion of a first step of said plurality of steps on said selected objects, for generating a copy of said selected objects in said volatile storage means, in modified condition from said first step, by invoking said third method, such that said second step is performed on said copy of said selected objects in said nonvolatile storage means.

5. The object oriented computing system of claim 4 wherein said unit of work object frame includes a unit of work instance object table having pointers to said objects which are processed together.

6. The object oriented computing system of claim 4 wherein said unit of work object frame further includes a unit of work instance object table having pointers to said objects which are processed together and to said copy of said objects which are processed together.

7. An object management process for an object oriented computing system executing on a data processing system, said object oriented computing system including a plurality of objects which are stored in nonvolatile storage and which are processed in volatile storage, each object including an object frame containing data attributes, and at least one object method for performing actions on the associated object, said object management process comprising the steps of:

providing a unit of work object class including a unit of work object frame containing pointers to objects which are processed together by said object oriented computing system, and including a first method for loading said objects which are processed together from nonvolatile storage to volatile storage, and a second method for storing said objects which are processed together from volatile storage to nonvolatile storage;

in response to a request to process selected ones of said plurality of objects together, generating an instance of sad unit of work object class, said instance of said unit of work object class including a pointer to each selected object;

invoking said first method on said instance of said unit of work object class to load said selected objects from nonvolatile storage to volatile storage;

processing said selected objects in volatile storage; and invoking said second method on said instance of said unit of work object class to store said selected objects in nonvolatile storage after processing;
wherein said objects which are processed together are processed in a plurality of steps;
said unit of work object class including a third method for generating in volatile storage a copy of said objects which are processed together in volatile storage, said unit of work object frame further including pointers to said copy of said objects which are processed together, and wherein said processing step comprises the step of:
invoking said third method in response to completion of a first step of said plurality of steps on said selected objects, to copy said selected objects in volatile storage, in modified condition from said first step, such that said second step is performed on said copy of said selected objects in nonvolatile storage.

8. The object management process of claim 7 wherein said unit of work object frame includes a unit of work instance object table having pointers to said objects which are processed together.

9. The object management process of claim 7 wherein said unit of work object frame further includes a unit of work instance object table having pointers to said objects which are processed together and to said copy of said objects which are processed together.

* * * * *

UNITED STATES PATENT AND TRADEMARK OFFICE
CERTIFICATE OF CORRECTION

PATENT NO. : 5,313,629

DATED : May 17, 1994

INVENTOR(S) : Abraham et al.

It is certified that error appears in the above-identified patent and that said Letters Patent is hereby corrected as shown below:

Column 8, line 44, "Object$_{13}$A" should be --Object_A--.

Column 14, line 57, "Instance$_{13}$" should be --Instance_--

Column 14, line 61, "Instance$_{13}$" should be --Instance_--.

Column 15, line 12, "Instance$_{13}$" should be --Instance_--.

Column 15, line 38, "Instance$_{13}$" should be --Instance_--.

Column 15, line 56, "Instance$_{13}$" should be --Instance_--.

Column 16, line 2, "Instance$_{13}$" should be --Instance_--.

Column 16, line 23, "Instance$_{13}$" should be --Instance_--.

Column 16, line 35, "Instance$_{13}$" should be --Instance_--.

Column 16, line 39, "Instance$_{13}$" should be --Instance_--.

UNITED STATES PATENT AND TRADEMARK OFFICE
CERTIFICATE OF CORRECTION

PATENT NO. : 5,313,629

DATED : May 17, 1994

INVENTOR(S) : Abraham et al.

It is certified that error appears in the above-identified patent and that said Letters Patent is hereby corrected as shown below:

Column 17, line 49, "$Instance_{13}$" should be --$Instance\_$--.

Column 18, line 18, "FIGS. 1-16" should be --FIGS. 14-16--.

Column 18, line 28, "$Instance_{13}$" should be --$Instance\_$--.

Column 18, line 60, "$Instance_{13}$" should be --$Instance\_$--.

Column 22, line 61, "sad" should be --said--.

Signed and Sealed this

Twenty-sixth Day of September, 1995

BRUCE LEHMAN

*Attest:*

*Attesting Officer*          *Commissioner of Patents and Trademarks*